United States Patent
Yaseen et al.

(10) Patent No.: US 9,535,663 B2
(45) Date of Patent: Jan. 3, 2017

(54) PATTERN-BASED CONSTRUCTION AND EXTENSION OF ENTERPRISE APPLICATIONS IN A CLOUD COMPUTING ENVIRONMENT

(75) Inventors: Rahim Mohamed Yaseen, Redwood City, CA (US); John Liang, Los Altos, CA (US); Yunhee Choi, Acton, MA (US); Xiaomei Zhang, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/236,022

(22) Filed: Sep. 19, 2011

(65) Prior Publication Data

US 2012/0185821 A1    Jul. 19, 2012

Related U.S. Application Data

(60) Provisional application No. 61/384,086, filed on Sep. 17, 2010.

(51) Int. Cl.
*G06F 9/44* (2006.01)

(52) U.S. Cl.
CPC .............. *G06F 8/10* (2013.01); *G06F 8/316* (2013.01); *G06F 8/35* (2013.01)

(58) Field of Classification Search
CPC ............ G06F 8/35; G06F 8/10; G06F 8/316; G06F 11/3072
USPC ................................................ 717/105, 104
See application file for complete search history.

(56) References Cited

U.S. PATENT DOCUMENTS

| | | | |
|---|---|---|---|
| 6,829,722 B2 * | 12/2004 | Lin | 714/6.13 |
| 6,931,625 B1 * | 8/2005 | Coad | G06F 8/20 714/E11.207 |
| 7,448,020 B2 * | 11/2008 | Kohno | 717/104 |
| 2004/0153992 A1 * | 8/2004 | Molina-Moreno et al. | 717/105 |
| 2004/0194052 A1 * | 9/2004 | Hoffschulz et al. | 717/100 |
| 2005/0177384 A1 * | 8/2005 | Cronin et al. | 705/1 |
| 2006/0230379 A1 * | 10/2006 | Pintos | 717/109 |
| 2007/0067755 A1 * | 3/2007 | Hinchey | G06F 8/10 717/135 |
| 2008/0082959 A1 * | 4/2008 | Fowler | 717/104 |
| 2009/0044173 A1 * | 2/2009 | Kohno | 717/121 |

(Continued)

OTHER PUBLICATIONS

Simonyi, Charles, Magus Christerson, and Shane Clifford; OOPSLA Onward Presentation; Oct. 25, 2006; 24 pages.

(Continued)

*Primary Examiner* — Viva Miller
(74) *Attorney, Agent, or Firm* — Sheppard, Mullin, Richter & Hampton LLP

(57) ABSTRACT

Methods, software programs and systems for extending and modifying software functionality, and, more particularly, for using one or more patterns for an enterprise software object to express desired functionality and configuration, and to generate the enterprise software object using the patterns, in an enterprise environment are disclosed. A method according to certain of these embodiments includes selecting one or more patterns from a number of patterns, where the one or more patterns are for an enterprise software object. The enterprise software object can then be generated. The enterprise software object is generated using the one or more patterns. Each of the patterns is configured to describe a solution within a corresponding one of a number of problem domains.

21 Claims, 22 Drawing Sheets

(56) References Cited

U.S. PATENT DOCUMENTS

| | | | |
|---|---|---|---|
| 2009/0094576 A1* | 4/2009 | Bouchard, Sr. | G06F 8/30 717/104 |
| 2009/0288068 A1* | 11/2009 | Gunsel et al. | 717/116 |
| 2010/0088671 A1* | 4/2010 | Rentsch | G06F 8/36 717/108 |
| 2010/0199264 A1* | 8/2010 | Maeda | 717/127 |
| 2011/0283194 A1* | 11/2011 | Chen et al. | 715/735 |

OTHER PUBLICATIONS

Simonyi, Charles, Magus Christerson, and Shane Clifford; "Intentional Software," Oct. 22, 2006; 13 pages.

Simonyi, Charles; "The Death of Computer Languages, The Birth of Intentional Programming"; Sep. 1995; Microsoft Corporation; 25 pages.

Singh, Abhinav; http://hackingalert.blogspot.com/2010/08/what-is-cloud-computing.html, "What is Cloud Computing?" Aug. 6, 2010; accessed Nov. 23, 2010; 3 pages.

"Intentional Programming" In: Czrnecki et al.: "Generative Programming Method Tools, and Applications", Aug. 2004, Addison-Wesley, XP002668202, ISBN: 0-201-30977-7, pp. 503-567.

Simonyi, Charles et al., Intentional Software Corporation, "*Intentional Software*," Oct. 10, 2006, AEM SIGPLAN Notices, pp. 451-463.

* cited by examiner

PATTERN-BASED CONSTRUCTION AND EXTENSION OF ENTERPRISE APPLICATIONS IN A CLOUD COMPUTING ENVIRONMENT

CROSS REFERENCE TO RELATED APPLICATIONS

This application claims the benefit under 35 U.S.C. §119 (e) of U.S. Provisional Application No. 61/384,086, filed Sep. 17, 2010, entitled "Pattern-Based Construction and Extension of Enterprise Applications in a Cloud Computing Environment," and naming Rahim Mohamed Yaseen, John Liang, Yunhee Choi and Xiaomei Zhang as inventors. The above-referenced application is hereby incorporated by reference herein, in its entirety and for all purposes.

FIELD OF THE INVENTION

The present invention relates to extending and modifying software functionality, and, more particularly, to using one or more patterns for an enterprise software object to express desired functionality and configuration, and to generate the enterprise software object using the patterns, in an enterprise environment.

BACKGROUND

Reductions in the cost of computing coupled with virtualization and large-scale utility computing have resulted in ubiquitous computing resources and network connectivity, which has, in turn, resulted in new computing paradigms (e.g., cloud computing). Such Internet-scale computing resources can reduce the cost of operations for many applications. Cloud computing further provides a foundation for collaborative applications and a target for mobile platforms. Cloud computing is based on a scalable server platform suitable for handling computing loads of highly interactive collaborative applications, such as social applications and cloud-based office applications.

As Internet-scale computing infrastructure becomes increasingly affordable to mass-paid services, cloud computing users will seek matching affordability in software resources. Cloud computing resources can provide platform-as-a-service (PaaS) products, including software and product development tools hosted within the cloud infrastructure. Alternatively, software-as-a-service (SaaS) cloud models include software products interacting with users through a front-end portal. In such environments, users will desire software functionality in an affordable price range. Such users may be, for example, business users with limited training and/or experience in software programming, if any at all. Notwithstanding, the need remains for enterprise customers of cloud resources to be able to configure software in a manner appropriate to their needs.

Historically, creation of software has been approached from the perspective of the computer. Most software is expressed through use of general purpose programming language. Thus, programs are focused on what is required of the computer (e.g., execution details), rather than the problems that the software is developed to address. Addressing changes to the problem or desired solution is thus effected by modifying the program's code. But the general purpose programming languages used to write software are just that—general—and so were not created to clearly express a specific problem to be solved. This makes writing such software, as well as making subsequent modifications (e.g., to reflect changes in the problem addressed thereby), a difficult task.

The people most familiar with the problem to be solved are those who use the software in their particular problem domain. Domain experts are familiar with the issues, concepts, and definitions that need to be satisfied in the problem domain. On the other hand, software programmers have expertise in software creation and, with the domain experts, traditionally work to generate software. This division of labor and expertise inevitably leads to frustration in one or both parties, as changes in program specifications and the complexity of the problem domain are understood by the domain expert, but cause numerous rewrites and revisions on the part of the programmer. Similarly, misunderstandings on the part of the programmer regarding the description provided by the domain expert can lead to frustration on the part of the domain expert.

FIG. 1A is a simplified block diagram illustrating a traditional software development workflow. A domain expert 105 communicates a problem statement to a programmer 110. This is typically done using forms that cannot be automatically transformed into code, such as specifications, use cases, stories, notes, sketches and the like. Programmer 110 then uses the intentions thus described, together with the programmer's knowledge and expertise in software engineering, to create source code 115, which can then be executed by a computer. Changes to software for purposes of either maintenance or correctness must be defined in the problem statement provided by domain expert 105, and then be separately implemented by programmer 110. In order to extend or otherwise maintain a program, programmer 110 must disassemble the implementation, reason about the part in question, solve the problem and then reassemble the implementation, in order to achieve the desired result. This process of "taking apart" software and then putting the software back together can introduce programming errors and increase costs of the software.

In order to have software mirror the domain expert's intentions for the software, it is preferable to express the problem in domain terms. This necessarily requires a second step that takes the problem description made in domain terms and transforms that description to a software that a computer can execute, that is, program generation. While a programmer can write code in a fashion that uses terminology familiar to the domain problems addressed by the software, such programming can prove difficult in large systems, with a domain having a complex vocabulary, and in other such circumstances.

In light of the foregoing, and to accommodate user's need for enterprise-class cloud programming facilities, it is therefore desirable to provide such users with application development environments that are (1) simple enough to be used by users lacking extensive programming training and/or experience, and (2) sufficiently easy to customize, both to match the skills of such users and allow for efficient customization. Further, such application development environments should allow application customization to be performed in a manner that does not interfere with other users' access to the cloud resources involved (e.g., the application(s) being customized).

SUMMARY

In various embodiments of the present invention, disclosed are methods, software programs and systems for extending and modifying software functionality, and, more particularly, for using one or more patterns for an enterprise software object to express desired functionality and configuration, and to generate the enterprise software object using the patterns, in an enterprise environment. A method according to certain of these embodiments includes selecting one or more patterns from a number of patterns, where the one or more patterns are for an enterprise software object. The enterprise software object can then be generated. The enterprise software object is generated using the one or more patterns. Each of the patterns is configured to describe a solution within a corresponding one of a number of problem domains.

The foregoing is a summary and thus contains, by necessity, simplifications, generalizations and omission of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a method, apparatus and system to construct application patterns using a generalized mechanism and to use those patterns to generate new or modified software objects. Such systems employ fundamental primitives and related operations to assemble simple patterns into semantic-rich patterns. Instantiated patterns (e.g., objects) can then be added to existing applications, thereby modifying those applications for purposes specific to an enterprise, for example. Embodiments of the present invention can further allow untrained users to extend applications (e.g., SaaS applications) using the pre-assembled patterns. Embodiments of the present invention also provide configuration tools for adding new software components to existing applications by accessing a repository of such patterns. Such configuration tools permit a user to select one or more patterns for an enterprise software object from the repository, provide parameter values appropriate for a particular instantiation of the patterns, and then, using those instantiated patterns, generate the enterprise software object.

Intentional Programming

Figure 1A:
FIG. 1A is a simplified block diagram illustrating a traditional software development workflow.
Figure 1B:
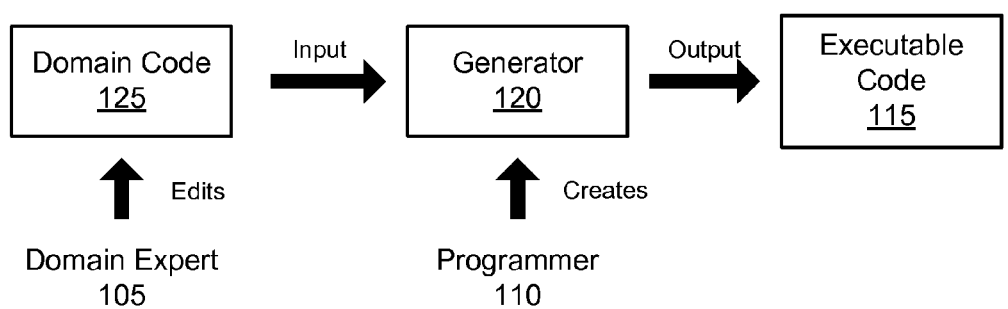
FIG. 1B is a simplified block diagram illustrating an example of a generative programming workflow.

FIG. 1B is a simplified block diagram illustrating an example of a generative programming workflow. In a generative programming environment, programmer 110 now focuses their efforts on designing and implementing the software needed to create a generator program 120 (also referred to herein as a pattern engine) that receives domain code 125 as an input, and outputs executable code 115. Domain code 125 can be expressed in a domain-specific language that includes terminology and concepts appropriate for the problem domain. The programmer's responsibility changes from directly writing a program and is instead focused on creation and maintenance of generator program 120. Program organization and data structures continue to be designed, defined, and written, but executable code 115 is parameterized by domain code 125. Changes desired in executable code 115 are affected by changes in domain code 125, which can be re-input to generator program 120 for those changes. The computer performs what would historically be the programmer's tasks, that is distributing domain code changes according to correspondence between the domain code language and the source code language.

Different applications of generative techniques can differ as to how a domain-specific language for domain code 125 is defined, how the domain code is created, and how generator program 120 uses the domain code. Use of generator program 120 separates concerns of domain experts from those of a programmer. In a generative software environment, a domain expert 105 is responsible for maintaining domain code 125. Generator program 120 is created and maintained by programmer 110 and defines how the domain code input should be processed to get an intended implementation (e.g., executable code 115). Generator program 120 represents implementation knowledge such as engineering design, algorithm choices, platforms and code patterns.

Previous implementations of generative programming environments suffer from practical application issues, such as defining the language of domain code 125, who defines and supports the domain-specific language and documentation, issues related to problems spanning more than one domain, and access of generator program 120 to domain code 125 through an application programming interface and the like. Further, previous solutions for domain-specific languages do not solve problems related to having users with minimal programming knowledge creating and modifying software components in an enterprise in a straightforward and efficient manner. These previous solutions continue to require learning of the domain-specific language and its syntax by a user. For example, one domain-specific language implementation requires the use of an "intentional tree," which is primarily theoretical and does not provide any sort of useful or practical solution for an enterprise. Other such solutions require knowledge of how to assemble different functional blocks in order to ensure proper interaction and functionality.

Enterprise Programming in the Cloud

Today's enterprise/cloud computing environments have removed users from direct control of the hardware on which software is executing, as well as control over the software itself. In the 1970's, technological breakthroughs significantly lowered cost of computing. Hardware innovations brought large scale computation into smaller footprints, such as a central processing unit implemented as a single integrated circuit inside a computer. The improvements in cost of computing also increased accessibility and availability of computing resources. Computer usage was no longer time-shared among a selected few. Widely available personal computing made mass adoption of computers a reality. While hardware became widely available, applications continued to be built by highly skilled programmers who were required to intimately understand the underlying platforms. During this period, cost of development for software was high compared with hardware cost. Applications were typically specialized, and so, targeted at trained professionals, focusing mostly on data management and process/office automation.

In the early 1990's, Internet access and web browsers obviated the need, in at least come scenarios, for a user to install software on the user's individual personal computer. A wide range of customer-facing applications became available to end users simply by clicking on a URL. Further, languages such as Java lowered the cost of software development by eliminating tasks such as automatic memory management and software portability. Web applications brought other software advances such as commoditization of user interfaces (UIs) and application frameworks.

Among other advantages, features and functionalities, today's application frameworks typically offer two major components: metadata (describing a problem in a language dictated by the framework), and a runtime engine (which performs actual runtime execution based on the given metadata provided by the application developer). These web-based applications have further separated problem description and execution. Software, therefore, no longer needed to be fashioned to serve as a single, specialized execution unit. Acts of changing the problem description involves only a change to the metadata, with no impact on runtime execution code.

In this second wave of mass adoption of computing resources, software advances in browsers, Java and frameworks lower the cost of software relative to hardware. Nonetheless, application developers were still required to have a high level of expertise in order to leverage the full range of options and controls typically available in an application development environment (also referred to herein as an application development framework (ADF)).

A third wave of mass adoption of computing resources has started with breakthroughs in reductions to cost of computation. Coupled with technological innovations such as virtualization and continued experience in large-scale utility computing, cloud computing makes an abundance of computing resources and network connectivity affordable at Internet scales. This availability of computing resources reduces costs of operations for web applications. Such availability also provides a foundation for continued development of collaborative applications and mobile applications. These Internet-scale infrastructures have become affordable to masses of users as paid services. These users are also looking for matching affordability in software. This also applies to other types of on-demand services such as video-on-demand. Content, in the realm of cloud computing, is simply the program or application executed on utility resources.

Figure 2A:
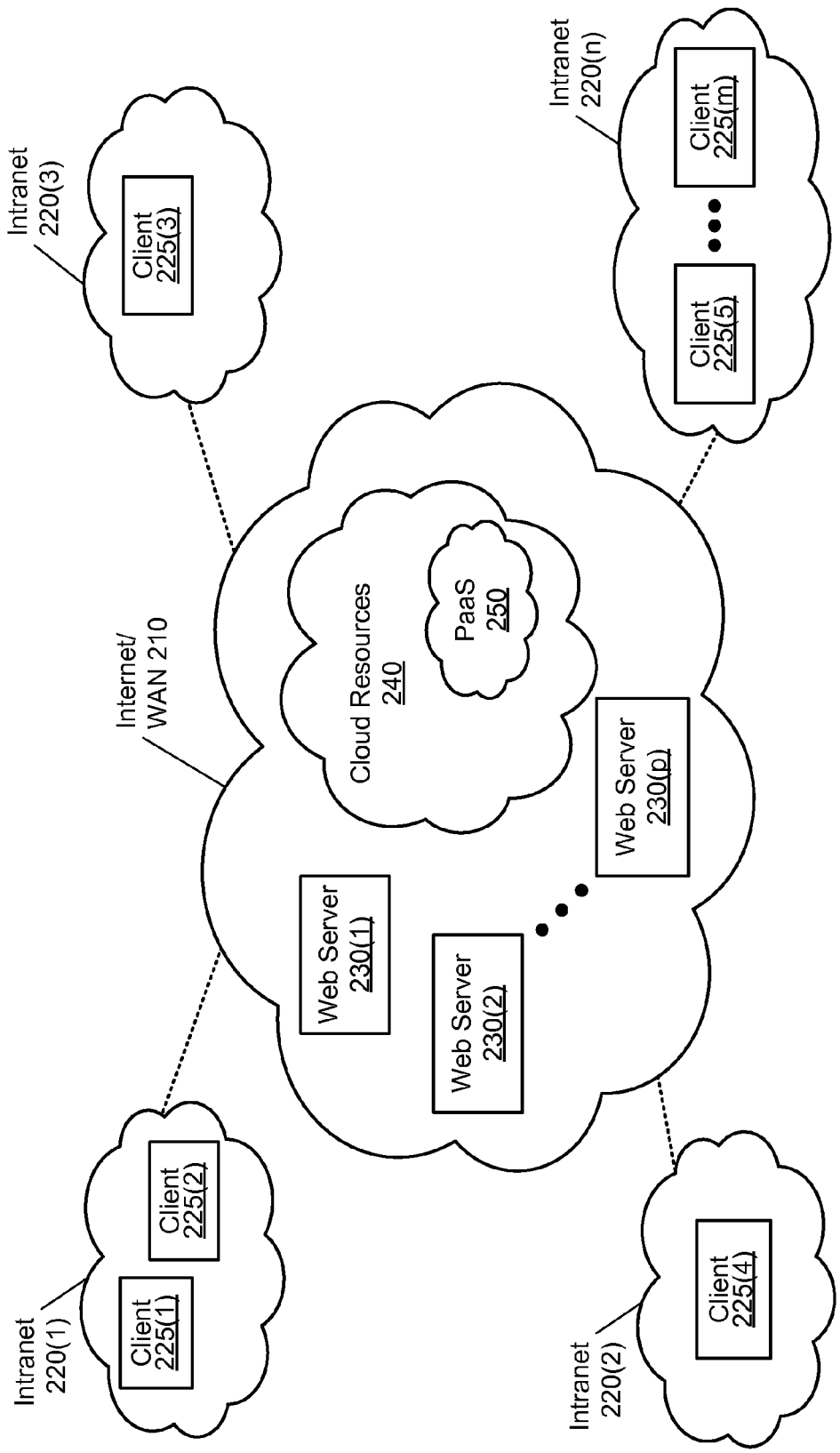
FIG. 2A is a simplified block diagram illustrating a concept of cloud computing.

FIG. 2A is a simplified block diagram illustrating a concept of cloud computing. An Internet or wide area network 210 is coupled to intranets or local area networks 220(1)-(n). Each intranet or local area network has one or more client computers 225(1)-(m). Through network connections between the intranet clients and Internet resources, client computers are able to access, for example, web servers 230(1)-(p) (also referred to as website servers, or more simply, as servers). In addition, one or more resources available through Internet 210 can provide hosted services in the form of cloud resources 240. Cloud computing is a general term for anything that involves delivering hosted services over a wide area network such as the Internet. Such services are generally broadly divided into three categories: infrastructure-as-a-service (IaaS), platform-as-a-service (PaaS) and software-as-a-service (SaaS). Cloud services are typically sold on-demand (e.g., by the minute or by the hour), they are elastic in that a user can have as much or as little of a service as they want at any given time, and the cloud services are fully managed by the provider of the cloud services.

A cloud can be private or public. Public clouds sell services to anyone that can access them, while private clouds are proprietary networks or data centers that supply hosted services to a limited number of users. Cloud service providers can use public cloud resources to create private clouds, resulting in virtual private clouds. In each case, the goal of cloud computing is to provide scalable access to computing resources and information technology services.

IaaS provides virtual server instances with unique network addresses and on-demand blocks of storage. An application programming interface (API) is provided for starting, stopping and accessing virtual service servers and storage. In an enterprise, IaaS cloud computing allows a company to pay for only as much capacity that is needed and to bring more capacity online as that capacity is needed.

PaaS in the cloud, an example of which is illustrated in FIG. 2A as a PaaS 250, provides a hosted set of software and product development tools. Developers can create applications on the provider's platform over the Internet. PaaS providers can deliver access to such services using, for example, APIs, website portals, gateway software installed on a customer's computer or the like.

In a SaaS architecture, the provider supplies a hardware infrastructure, software products and interacts with a user through a front-end portal. Provided services can include, for example, web-based email, inventory control, and database processing. Since the service provider hosts both the application and the data, an end user is free to use the service from anywhere.

As can be seen from the above descriptions of cloud computing, a cloud's resources (i.e., cloud resources) can be viewed as an abstraction of the physical computer resources. An end user typically has no control over either the hardware or the software, particularly in SaaS and PaaS environments. Since different enterprises using the same cloud resources can have different requirements for satisfying the needs of their particular enterprise, a mechanism is needed for users to modify the software they use in a manner appropriate to the enterprise in question. The generative software concepts discussed previously recognize this issue, but fail to provide a practical solution to providing tools capable of creating and modifying software resources such as those provided in a cloud computing environment. Further, because cloud resources are accessed by many users (who may well be associated with different enterprises), any tools used to modify software in a cloud computing environment cannot disrupt the provision of cloud resources to other users. Therefore, certain guarantees need to be provided to ensure functionality of the changes made to the software. That is, tools that enable users to modify software resources should be validated for use in the given cloud computing environment.

Patterns for the Description of User Intentions

In an enterprise, a domain expert may, for example, want to modify or create original or additional objects (e.g., business objects, data objects, user interface objects or the like). Frequently, performing such tasks includes performing at least some of the same (or similar) operations. Further, achieving the intended outcome (e.g., the existence of a new data object via its creation) may necessitate the creation of (or changes to) other objects/categories (e.g., a new field in a user interface display). Sets of such commonly-recurring operations, performed to achieve the desired objective(s), are referred to herein as patterns. In one embodiment, such patterns include a pattern declaration (e.g., which, for configuration operations, expose essential configuration options) and a pattern definition (e.g., which encapsulates the details of software component generation (accessed, e.g., via a middleware API)). The use of patterns provides both simplicity (e.g., by hiding the complexities of programming from users) and adaptability (e.g., by encapsulating changes to applications, middleware and so on).

In embodiments of the present invention, a pattern describes a commonly occurring solution within a given problem domain. In addition, the pattern can specify the manner in which an instance (a concrete or tangible representation) of that solution (an abstract concept) can be created, and so described (e.g., the manner in which the recurring solution can be instantiated on a particular target platform). As will be appreciated in light of the present disclosure, the instantiation of such solutions (abstractions) comprehends the creation of a real instance or particular realization of the solution (e.g., as a template, such as a class of objects or a computer process). Such instantiation operations create instances of the corresponding solution(s) by, for example, defining a particular variation of an object within a class (representing the solution), giving the object a name, and storing the object in some physical place (e.g., storing the object in a computer-readable medium, such as a computer memory). As such, patterns can also provide a generalized mechanism for a domain expert to form (and express) an intent for desired modifications to such software.

Figure 2B:
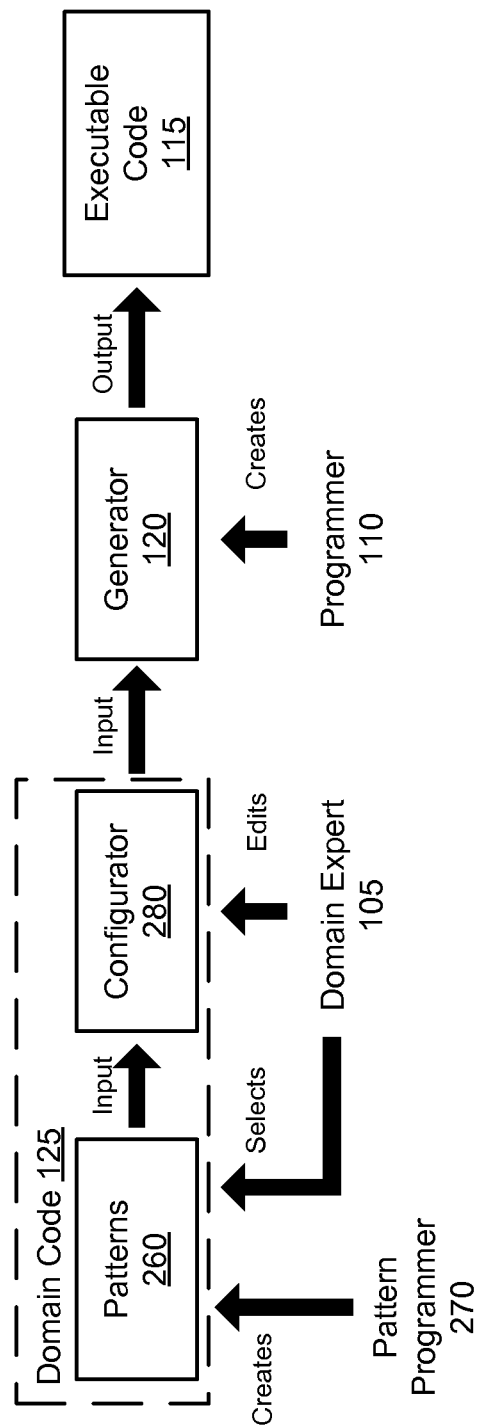
FIG. 2B is a simplified block diagram illustrating an example of problem solution flow incorporating patterns, in accord with embodiments of the present invention.

FIG. 2B is a simplified block diagram illustrating an example of problem solution flow incorporating patterns, in accord with embodiments of the present invention. As with FIG. 1B, programmer 110 is primarily concerned with creating a generator program 120 that can produce the desired executable code 115 as its output. As with FIG. 1B, domain code 125 is provided as input to generator program 120.

Unlike FIG. 1B, one or more patterns are made available to domain expert 105 (depicted in FIG. 2B as patterns 260, for example), in order to allow domain expert 105 to express their intent as to the generation of the desired domain code that will serve as the input to generator program 120 (e.g., domain code such as domain code 125 of FIG. 1B). Patterns 260 can be made available to domain expert 105 in the form of a repository of patterns (not depicted in FIG. 2B; however, as will be appreciated, patterns 260 of FIG. 2B could be stored in and selected from such a pattern repository, for example). Such a repository of patterns can be created for a particular domain or multiple domains, for example, by a pattern programmer 270. Pattern programmer 270 is typically an expert programmer who prepares patterns that are not solutions for a specific instance of a problem, but instead reflect a more general approach for solving a given class of problems. A pattern programmer such as pattern programmer 270 should understand sophisticated nuances of the solution that is to be captured in the pattern. The patterns should be well-formulated, including the requisite variances for the desired objects (e.g., differing user interface elements and differing looks of those elements).

Domain expert 105 selects one or more patterns from the repository containing patterns 260, and then makes the desired/necessary modifications to ("edits") elements of the pattern using, for example, a configurator 280. For example, various parameters may need to be defined to instantiate a pattern, and thus domain expert 105 will provide values for those various parameters. Alternatively, a pattern can have sub-patterns that can be selected, which can, in turn, have defined parameters. A set of rules associated with a pattern and sub-patterns can restrict pattern and parameter values selection. Through the existence of patterns and sub-patterns, a system such as that described herein is able to create increasingly complicated and capable patterns by using other (typically simpler) patterns as building blocks. In fact, it is very often the case that the patterns employed are of the more complex variety, and in addition to their greater functionality, their use provides a certain amount of abstraction that hides the complexity of the underlying patterns, thereby simplifying the use of these more complex patterns.

Configurator 280 then generates domain code 125 used as input to generator program 120. Embodiments of the present invention are not restricted to the configuration of blocks shown in FIG. 2B. For example, functionality of configurator 280 and generator program 120 can be combined, resulting in a functional element having selected patterns and modifications by domain expert 105 as its inputs, and executable code 115 as its output.

The design of such patterns should also provide for their evolution over time, for example, taking into consideration the fact that the enterprise objects to which such patterns are to be applied may also change over time. In order to provide for such evolution, the generation of such patterns can employ one or more of the following pattern evolution techniques: aspect orientation, variantization, composition, interaction, and constraints, as discussed immediately below, and subsequently in greater detail Each pattern can have different aspects that evolve or are implemented separately. For example, for a user interface pattern, there can be different aspects such as display, security, style and localization. Each aspect is independently translated or evolved. Further, variantization allows a pattern to be altered based on the situation. For example, a user interface pattern can look slightly different from one application to another. Alternatively, when a text field is added to a form, the text can be rendered as a text entry. But if the same text field is added to a read-only table, the text field is rendered as a simple string. One mechanism for implementing variantization is to have the pattern be metadata driven. That is, a pattern generates metadata for a target platform, but that pattern is also described by metadata (e.g., meta-metadata). The meta-metadata is variantized based on the specific situation.

A composition model for patterns allows a complex pattern to be assembled from a set of simpler patterns. Composition rules contain structural requirements in terms of assembling patterns. Interaction rules specify behavioral dependency of components within a pattern. Interaction is focused on describing interdependency of components that affect the runtime system. For example, a user interface component can cause a partial refresh of other components within a page. Finally, constraint rules specify restrictions or guidelines that are enforced during metadata generation. Constraints can be governed based on restriction of the target platform or preferred best practices, and can adhere the composition and interaction rules to the restrictions and guidelines. For example, a user interface best practice may require that a table does not contain any text area component.

A cloud programming model according to embodiments of the present invention thus implements a programming paradigm and principles that allow "self-service programmers" to create and modify software using intentional programming techniques. The need for such programming paradigm is evident from the fact that, while such users may be experts in their area of expertise, they have minimal or no training in computer programming. For example, such a user could be a salesperson, who is also a part-time system administrator. As noted earlier, existing paradigms fail to address the problem of simplifying the programming experience. In fact, the myriad technologies available heretofore have only made the work of computer programming even more challenging. As software has become more complex, the programming code written for actual business logic has remained proportionally small, in comparison with the effort required to learn an application framework.

An advantage of a cloud programming model according to embodiments of the present invention is the simplification of the programming experience for new programmers. This includes various precepts that are directed to addressing the needs of such programmers in a cloud-based computing environment. Fundamentally, such a programming environment needs to be able to address intention instead of translation. The programming environment should focus on allowing for the description of the desired outcome, rather than the manner in which the problem's solution is or will be implemented in a particular framework/environment. Preferably, the user should be able to specify (describe) the given intention through a business-centric user interface (UI), rather than an integrated design environment or the like. Such a business-centric UI is structured to assist the user with describing the problem, instead of managing programming tasks. In other words, such a user does not write a program in a classical sense (although the result of capturing the user's intentions still constitutes a "program," in a logical sense).

Further, the vocabulary and notation used for describing the intention(s) should be closely aligned with the problem domain. In a classical sense, the vocabulary and notation often constitute the syntax. The syntax, in this sense, should be adapted to the problem domain, rather than relying on a programmer to translate intention into a program with a fixed syntax (e.g., a general programming language). Such a vocabulary and notation should be adaptable (e.g., for use in addressing new requirements). Since a focus of a programming environment according to embodiments of the present invention is to capture user intention, the capability of the program (syntax) should support evolution to address new and changing requirements.

Preferable also is the ability of the programming environment to be executed on existing software and hardware infrastructure (e.g., middleware runtime, database infrastructure, servers, and so on), without modification thereof (e.g., without the need for a new dedicated runtime engine). In other words, the use and implementation of a cloud programming model according to embodiments of the present invention provides the advantage of marked simplification of the programming model, in comparison to classical approaches. For example, in terms of a middleware platform, such an approach is not intended as simply a re-invention of that middleware platform, but is instead directed to the seamless, automatic translation of user intention into a target metadata/language that can then be executed by the middleware platform.

Thus, a programming environment according to embodiments of the present invention should provide for the direct and simple correlation between the intention and the "effect" of the intention's translation. In the preceding example, the "effect" of a translation is therefore not the middleware artifacts being generated, but instead the (desired) observable behavior in an application created or modified by the user. For example, if the user intention is to create a new page for a custom entity, the effect of the translation is a new page in the application, where the page is rendered with a certain look-and-feel and layout. In providing such an environment, the user should be exposed to as little of the system's internal implementation details as possible (preferably, in fact, the user should be completely isolated from such details). In the preceding example, this means that the user would have no knowledge of the middleware metadata or runtime (nor need for any such knowledge), for example. The middleware would thus be able to evolve over time, changing from release-to-release, without any resulting alterations being observable by the user.

Design of a Cloud Programming Model Using Intentional Programming

The following passages describe an example of an implementation of a cloud programming model supporting "self-service" programming, according to embodiments of the present invention, which embodies the aforementioned principles. Moreover, in providing such functionality, a programming environment, such as that described herein, is also able to achieve goals related to extensibility, particularly with regard to the aforementioned self-service programming concepts. For example, such an extensible cloud programming environment provides a generalized mechanism by which such self-service programmers can construct and/or modify software components, in order to build the desired software application(s) (e.g., a customer relationship management (CRM) application). Thus, such a programming environment allows the development of the fundamental primitives and operations that are needed to assemble simple components into semantic-rich components (referred to herein as component composition). A simple example of component composition is the assembling of a set of user interface elements (e.g., for text input) into a form, based on a set of specific layout restrictions and requirements. An extensible cloud programming environment, such as that described herein, also allows the adoption of a component composition technology for on-demand software applications (e.g., a CRM SaaS application), in order to allow untrained users (self-service programmers) to extend the application (e.g., CRM SaaS application) using pre-configured components.

The example design presented below can be broken down into four major pieces. The first comprehends a language that captures intention of the programmer (referred to herein as the aforementioned "self-service programmer"). Next is a forward-translation implementation, which converts intent into an executable (e.g., a middleware executable). Another part of such a programming environment is a reverse-translation implementation, which is designed to convert an executable into an intent (e.g., the conversion of a middleware executable into an intent). The last of these four pieces is a configuration user interface (e.g., in a CRM environment, a business-centric configuration UI) that is designed to guide the programmer in specifying their intent without the need for, nor knowledge of, any programming details.

Intent Specification

The purpose of intent specification in a programming environment according to embodiments of the present invention is to allow a self-service programmer to focus on the desired outcome, rather than the manner in which the step-by-step process of carrying out instructions is to proceed within the given computer system(s). Furthermore, such a language can be adapted and modified with relative ease. Such an approach allows the specification of each intention as a command. Each command identifies an action or actions that the programmer intends to have the computer system(s) carry out. A command also can carry a set of user properties that further provides specifics regarding the action to be performed.

Such a command differs from a traditional programming instruction in several respects. Among these differences is the fact that such a command operates at a higher level of abstraction, and addresses the programmer's intention and requirements, while lacking the ability to definitely direct the given computer system(s) to perform a specific instruction in the instruction set(s) of the computer system(s). By marked contrast, a traditional programming instruction (e.g., an instruction in a computer system's instruction set, such as a single machine instruction) exists at the other end of the spectrum, and as such, is tailored to the requirements of the computing device.

Forward-Translation

Forward-translation gives effect to the self-service programmer's intent by providing the system for which the programming is intended (e.g., the aforementioned middleware platform) with direction as to the operations to be performed, based on the commands received from the self-service programmer, which embody that intent. In embodiments of the present invention, a unit of translation is encapsulated within a conceptual (i.e., logical) construct referred to herein as a pattern, which describes a (predefined) solution within a particular problem domain. In addition, such a pattern can be designed to carry a specification of the manner in which a recurring solution for a particular target platform is to be "materialized" (e.g., instantiated). When a command is invoked, one or more patterns are thus materialized. During materialization in the example middleware system, for example, the translation generates the requisite metadata for the given target platform to implement the desired solution. It will be appreciated that, in light of the present disclosure, the patterns described herein can be re-used any number of times (with or without being reconfigured in any given iteration).

In supporting forward-translation, it is desirable to provide support for the earlier-mentioned concept of pattern evolution. Such functionality ensures that the patterns thus materialized can be easily and efficiently evolved, in response to changes in requirements. Several techniques are described herein that provide the requisite functionality, and include:

1) Aspect Orientation. Each pattern may have different aspects (i.e., various characteristics or features that reflect various considerations, concerns and the like, which are addressed/captured by their corresponding constructs) that need to evolve separately (e.g., be implemented separately, allowing them to change independently over time, for example). For example, different aspects for a UI pattern might include aspects such as display, security, style and localization. Each aspect can be independently translated or evolved, in order to allow such aspects to be separately tailored to the given situation, and so best meet that situation's needs.

2) Variantization. As noted, a pattern may vary from situation-to-situation. For example, a UI pattern may look slightly different from one vertical application to another. Variantization results in the pattern itself being metadata-driven. In another words, the pattern generates metadata for target middleware platform, but a pattern is itself also described by metadata (and so can be described as meta-metadata). Such meta-metadata, therefore, can be variantized based on specific situation.

3) Composition rules. A complex pattern can be assembled from a set of simpler patterns. The structural requirements, in terms of assembling patterns from one another, can be contained in composition rules, for example.

4) Interaction rules. In contrast to composition rules, which specify rules for the assembly of patterns, interaction rules specify the behavioral dependency of the components within a pattern. The main focus of interaction rules is to describe interdependencies between the components that affect the runtime system. For example, a UI component can cause a partial refresh of other components within a page.

5) Constraint rules. A constraint rule specifies the restrictions or guidelines that are enforced during the generation of various constructs (e.g., metadata generation). Constraint rules can, for example, specify a constraint based on the restriction of the target platform or preferred best practices. In such a scenario, for example, a UI best practice may require that a table not contain any text area component.

Reverse-Translation

In reverse-translation (also referred to herein as "reflection"), a programming environment according to embodiments of the present invention recognizes one or more patterns from existing constructs (e.g., existing middleware metadata). Reverse-translation thus provides for the revision and migration of such constructs through the abstraction provided by patterns (i.e., pattern abstraction). In the example of middleware metadata, such pattern abstraction means that middleware metadata can be generated in a manner that facilitates its revision and migration. (It should be understood that, as used herein, the term "facilitate" is intended to convey that the functionality or structure discussed is helpful in assisting the given system or process in accomplishing the stated result, and not that the functionality or structure in question is required to accomplish that result, or mandatory in any way.) In a programming environment according to embodiments of the present invention, such reverse-translation can be achieved, for example, through the use of a rules-based pattern recognizer.

Application-Centric Configuration User Interface

An application-centric configuration user interface according to embodiments of the present invention acts a front-end application (e.g., web application) that enables the self-service programmer to describe their intent as a configuration task, without the need for any actual programming. As the programmer navigates through this user interface, their intent is captured. Commands can then be issued to initiate the materialization of the pattern. The result of such pattern materialization is the generation of programmatic constructs (e.g., the generation of generated middleware metadata). In the example, immediate feedback regarding the generated middleware metadata can be presented to the programmer through the UI by way of reverse-translation. Unlike a conventional middleware integrated design environment, a UI according to embodiments of the present invention can be used to trigger the translation of a simple user intent into complicated programmatic constructs. A conventional middleware integrated design environment, by contrast, fails to provide such functionality, and therefore, presents itself as a mere programming tool.

Enterprise Software Object Generation

Figure 3:
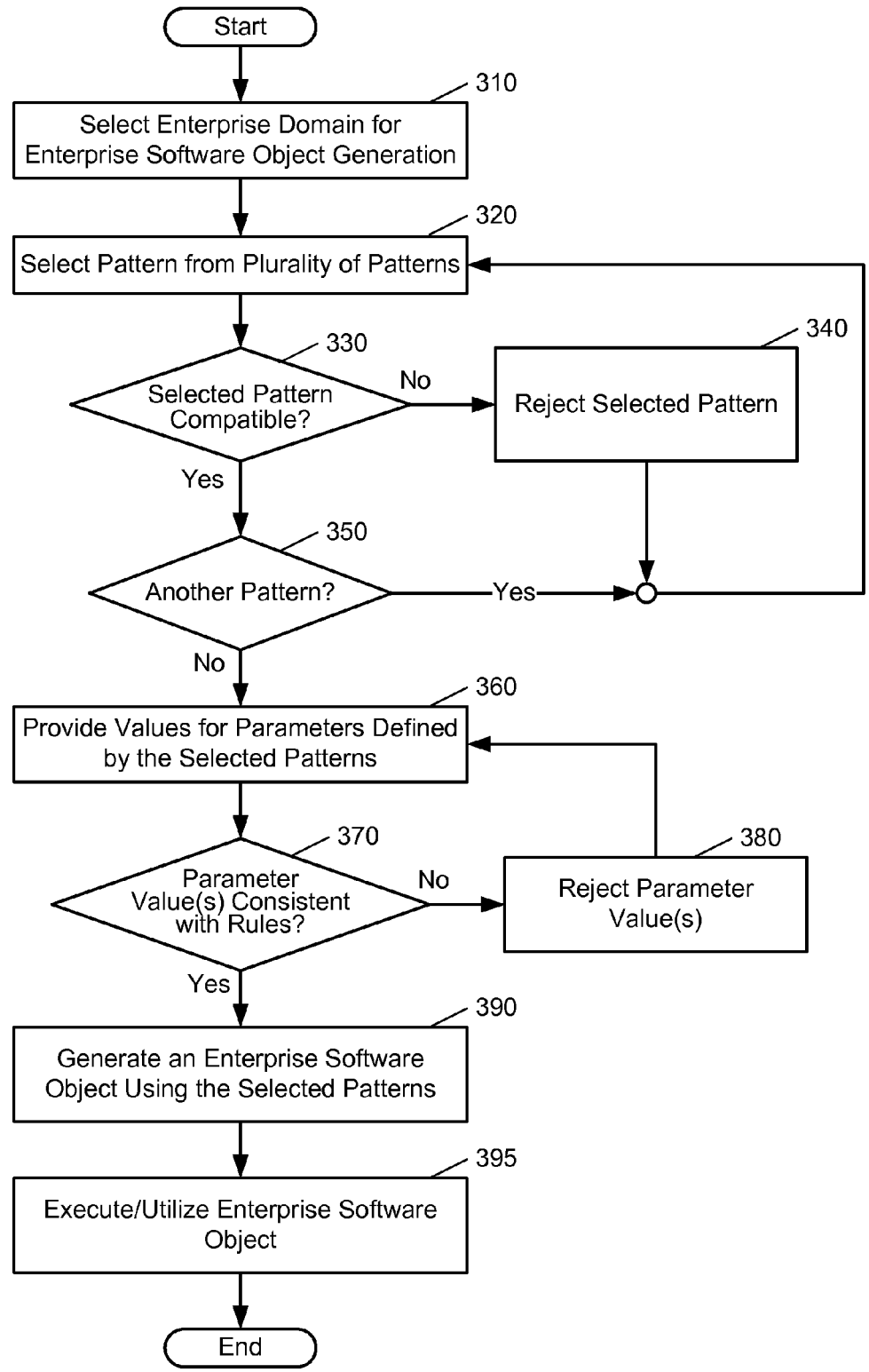
FIG. 3 is a simplified flow diagram illustrating an example of enterprise software object generation using patterns, in accord with embodiments of the present invention.

FIG. 3 is a simplified flow diagram illustrating an example of enterprise software object generation using patterns, in accord with embodiments of the present invention. As illustrated, the process of FIG. 3 begins with the selection of an enterprise domain for enterprise software object generation (step 310). Since one embodiment of the present invention is envisioned as functioning within a cloud computing environment in which multiple enterprises are sharing resources along with a variety of domains in those enterprises (e.g., customer relationship management (CRM) and human resource management (HRM)), a selection of an appropriate domain is made in order to determine subsets of patterns from which to operate. Selection of the domain can be an automatic process based upon user identification or group identification of a particular user, or this can be an entered selection by a user, for example.

From a plurality of patterns made available to the selected domain, a pattern is selected by a user (step 320). Selection of an appropriate pattern is made based upon the nature of the object desired to be created or modified and the nature of the problem to be solved. If the selected pattern is not compatible with previously selected patterns (step 330), then the selected pattern can be rejected (step 340). A compatibility determination can be made, for example, by consulting one or more rules associated with previously selected patterns. As described above, compositional rules and interaction rules affect relationships between patterns. These rules can be associated with the patterns when they are generated, or subsequently added as new patterns are placed within the pattern repository and conflicts between patterns are discovered. If the selected pattern has been rejected, a user is given the opportunity to select a different pattern (step 320). If the selected pattern is not rejected, a user is then given the opportunity to select additional patterns (step 350).

Once a user has selected all the patterns that are desired for creation or modification of an enterprise object, the user is prompted to provide values for parameters defined by the one or more selected patterns (e.g., variable values, field definitions, and the like) (step 360). This process of pattern selection, rule confirmation, and parameter specification can be performed within, for example, a configurator such as configurator 280 of FIG. 2B. As parameter values are provided, a determination is made as to whether the parameter values are consistent with the rules associated with the pattern and other patterns being instantiated (step 370). If a parameter value is outside a range or specific value specified by a rule, for example, the parameter value is rejected (step 380), and the user is given another opportunity to provide values acceptable, in light of the given rules.

Once parameter values, appropriate to the problem to be solved, have been entered for parameters associated with the selected patterns, an enterprise software object is generated by a generator program (e.g., generator program 120 of FIG. 2B), using the selected patterns (step 390). For example, in the embodiment illustrated in FIG. 2B, configurator 280 assembles the pattern specifications along with the specific values of the parameters to generate a domain code file along with appropriate metadata that serves as an input to generator program 120. Generator program 120 then generates executable "code" (instructions) for the desired platform (e.g., executable code in the Java programming language, for a specific platform (e.g., the original Java 2 Platform, Enterprise Edition (J2EE), or the more recent Java Platform, Enterprise Edition 6 (Java EE 6)). Alternatively, where functionality of the configurator and the generator are combined, patterns, parameter values, and additional metadata can be used to directly generate executable code. Once the desired enterprise object has been generated, that object is then available to be executed on the appropriate platform (step 395).

Generator program 120 can employ any one of a number of approaches to generate the requisite executable code. As will be appreciated in light of the present disclosure, and as previously observed, embodiments of the present invention employ a generative approach, as opposed to a component-based approach. In constructing software systems using either approach, there is a distinction between the language employed and intention(s) captured thereby, and the executables (software) generated for the given implementation. As will also be appreciated, there is a clear distinction between these stages of software development. In a component-based approach, the language and resulting executable are closely interwoven with one another. Thus, using a component-based approach, a single intention (using a single language to express that intention through the hand-coding of the desired software) maps to a single implementation (as reflected in the single executable that results). By contrast, using a generative approach such as that described herein, a single language/intention can yield a number of different executables/implementations, depending on a variety of factors. This decoupling of language/intention and resulting executable/implementation, provided by approaches according to embodiments of the present invention, results in such approaches being able to provide great flexibility in the generation of such executables/implementations. This is particularly true when the ability of such approaches to dynamically map intentions to executables is considered. For example, as the result of a process according to embodiments of the present invention, a single intention (e.g., to create a web page capable of displaying an object detail) may map to any one of a number of different implementations, based on the given country, industry, and so on.

Using the aforementioned example of generating executable code in the Java programming language, generator program 120 receives a number of patterns as input. Each of these patterns includes different aspects. Each such aspect will have a corresponding content provider. A content provider is responsible for generating and injecting the requisite metadata into the given object (e.g., a specific middleware component). Each content provider, in essence, behaves like a dedicated compiler, specific to the given aspect. As an example, when a component of a user interface is generated, one or more aspects may be involved. For example, two aspects that are typically so involved are a view aspect (e.g., for generating the presentation (the actual layout and so on)) and a security aspect (e.g., for generating the security policy for that user interface). In such a scenario, there are two corresponding content providers. The view content provider generates metadata for the page that conforms to the Java Server Faces (JSF) specification. The security content provider creates and injects security policy into the appropriate server. Such a security content provider can include, for example, a Lightweight Directory Access Protocol (LDAP) server, configured to authenticate and authorize access to an organized set of records (e.g., a database, repository, store or other such construct (any and all of which may, in fact, be one and the same)) by one or more network entities (e.g., one or more of clients 225 or servers 230), as well as facilitating access to and maintenance of the distributed directory information services involved in providing such access, among other such supporting functions.

Patterns, in the manner noted, are an abstraction of commonly recurring implementations for a specific application. As noted above, these implementations can include look and feel, guidelines, standards, and the like. Patterns are configured to expose essential configuration options for enterprise objects, favoring convention over the configuration of the enterprise object. Due to their generalized nature, patterns are typically more enduring than the instances of the enterprise objects generated from a pattern.

Figure 4:
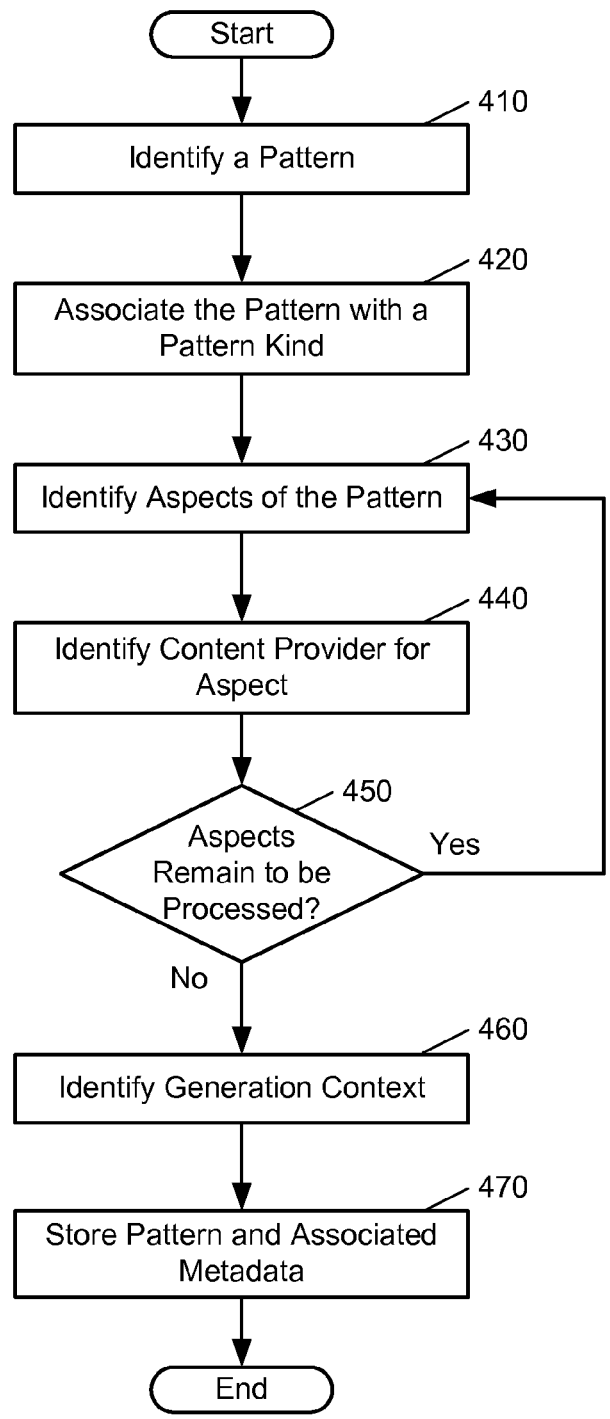
FIG. 4 is a simplified flow diagram illustrating an example of operations performed in creating a pattern, in accord with embodiments of the present invention.

FIG. 4 is a simplified flow diagram illustrating an example of operations performed in creating a pattern, in accord with embodiments of the present invention. The process of generating a pattern, as illustrated in FIG. 4, begins with the identification of the pattern to be created (step 410). As noted earlier, a pattern according to embodiments of the present invention describes a solution to a problem in a given problem domain. As also noted earlier, identification of patterns for a particular domain typically relies, at least to some degree, on familiarity with common problems and solutions within that domain. Typically, the solution described is a commonly occurring one, and, more specifically, can be represented by an abstraction of commonly recurring implementations of such solutions in specific applications. Identification of these recurring solutions, or recurring steps leading to solutions, will typically be performed by a programmer operating in the domain space, (e.g., pattern programmer 270). In so doing, pattern programmer 270 can create patterns embodying such solutions, with the intention of such patterns being used "as is." Alternatively, pattern programmer 270 can create such patterns for the purpose of providing the patterns to others (e.g., self-service programmers) for customization, in order to allow those parties to customize the given pattern(s) to their specific needs. Further still, pattern programmer 270 can create a pattern such that the pattern simply defines a "universe" within the solution space of the problem domain, and within which a user such as a self-service programmers can give effect to their intent by, in effect, creating a situation-specific pattern. By creating a pattern that defines such a universe a pattern programmer such as pattern programmer 270 is able to provide "boundaries" for the self-service programmer, and so guide the self-service programmer through the various possible solutions that exist within the solution space at hand, while allowing the self-service programmer a certain amount of latitude in defining the manner in which that solution is reached.

Once a pattern has been identified, the pattern can be associated with a "Pattern Kind," either new or old (step 420). The main purpose of a Pattern Kind is to enforce uniformity among patterns of the same "kind." A Pattern Kind can serve to specify common specifications and resources sharable among patterns of the same kind. Further, a Pattern Kind can specify an externalized contract for the pattern, including, for example, a list of aspects the pattern can have, common specifications and resources among patterns in the kind, a collection of properties for patterns in the kind, a collection of aspects for one or more sub-patterns, and lists of literals with their values for patterns in the kind. Patterns can belong to more than one Pattern Kind, if appropriate. When associating a pattern with a Pattern Kind, the pattern will adopt characteristics specified by the Pattern Kind, unless overwritten by values within the pattern, for parameters such as, for example, properties, aspects, variables, and the like.

Aspects for the pattern are also identified in creating the pattern (step 430). As stated above, an aspect specifies requirements for instantiating a pattern. Aspects can include physical representations of a pattern in the target domain. For example, a user interface pattern may have one or more of the following aspects: view aspect, security aspect, display aspect, and binding aspect, among others. Typically, the first two aspects are mandatory, while the latter are typically optional. A display aspect specifies look and feel of the pattern. A binding aspect specifies how the pattern interacts with the underlying model. A display aspect and a binding aspect have their own physical representations (e.g., extensible markup language (XML) schemas).

For each aspect of a pattern, a content provider for the aspect is identified (step 440). A content provider specifies how to generate the content for the particular representation.

In one embodiment, a content provider is a Java class that controls how the content is being fabricated for a certain aspect. Content providers can generate the content using templates, which, in one embodiment, are XML documents containing partial implementations of the content. A template content provider can contain switching logic to determine which template to use depending on a situation. For example, if an input text pattern is being created and the target container is a table, the content provider can choose a template that wraps the input text user interface control under a column element.

In one embodiment of the present invention, the output of a content provider is a content object, which is a self-descriptive object that contains the generated content and additional information about the content such as implementation type, identifying implementations used for the content and an aspect in which the content is being generated for. Templates specify a pattern's content for a specific aspect. The content of a pattern represented in a template can include, for example, language-specific literals including textual fragments that are specific to the target representation, variables whose values can be substituted when the template is instantiated, sub-patterns included within a pattern, conditionals based on input properties and template parameters, and sub-templates embedded within the template. Once the content provider for an aspect is identified, a determination is made as to whether the last aspect has been identified (step 450). If other aspects remain, such additional aspects are identified (step 430), as the process loops through the remaining aspects of the pattern. If the last aspect has been identified, a generation context for the pattern is then identified (step 460). A generation context is a set of resources available when the pattern is instantiated. These resources are accessible in the template as variables. The pattern and its associated metadata are then stored (e.g., in a pattern repository, accessible to privileged users) (step 470).

Figure 5:
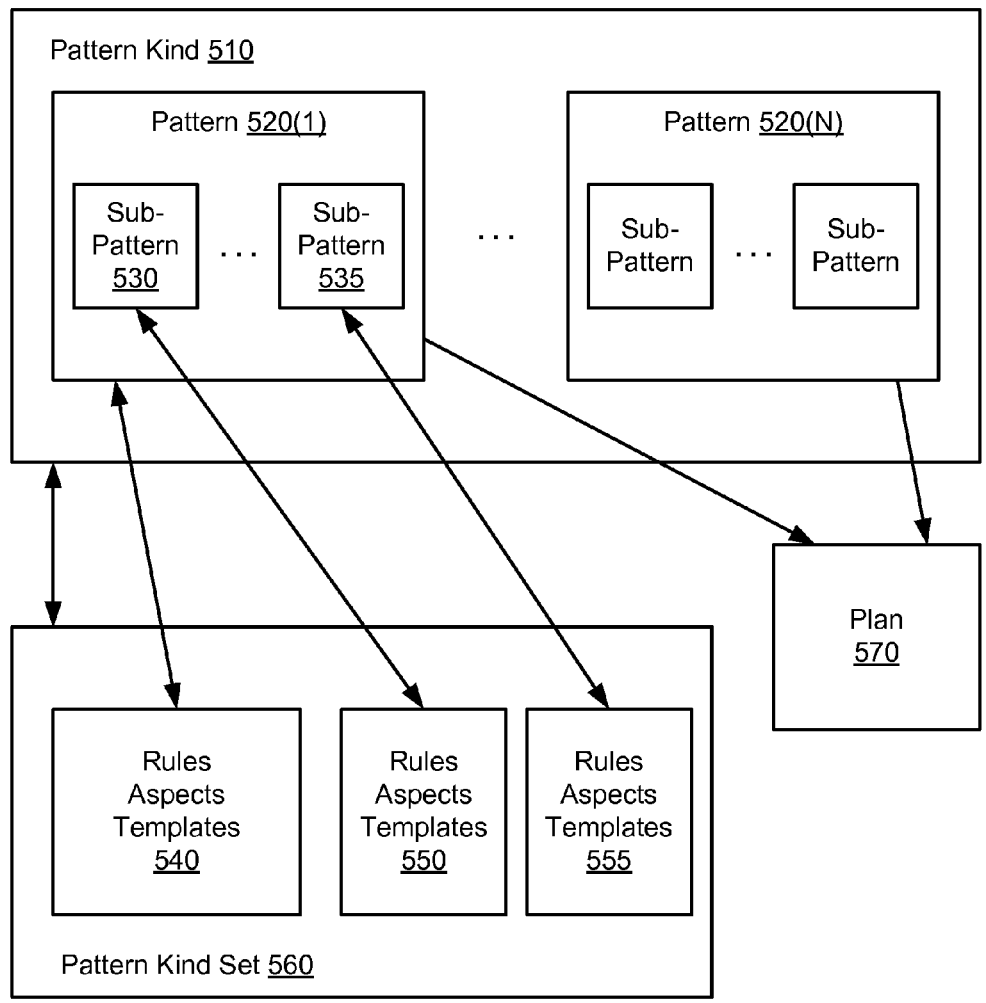
FIG. 5 is a simplified block diagram illustrating an example of relationships between patterns, sub-patterns, pattern kinds and various rules/aspects/templates, in accord with embodiments of the present invention.

FIG. 5 is a simplified block diagram illustrating an example of relationships between patterns, sub-patterns, pattern kinds and various rules/aspects/templates. A Pattern Kind (depicted in FIG. 5 as a pattern kind 510), which specifies common specifications and resources sharable among patterns and external contracts used for patterns, can include one or more patterns (depicted in FIG. 5 as patterns 520) that adopt those specifications, resources and external contract. A pattern can include one or more sub-patterns 530, which can provide more basic elements to the pattern. For example, a sub-pattern can relate to a date picker element included in a user interface window that is being described by a pattern. Pattern 520 can be constrained by a set of rules, aspects, and templates 540. Similarly, each sub-pattern 530 can be associated with a set of rules, aspects, templates 550, and likewise a second sub-pattern 535 can be associated with a second set of rules, aspects, and templates 555. As discussed above, the constraining rules, aspects and templates provide various parameters that are associated with each of the patterns, and which constrain various combinations of values and combinations of sub-patterns that can permissibly interact within the pattern. Further, Pattern Kind 510 can be associated with a pattern kind set of rules, aspects and templates 560. The relationship between the pattern kind and patterns and sub-patterns can be thought of as a hierarchical relationship. Patterns within a Pattern Kind adopt characteristics specified by the Pattern Kind, unless overwritten by values within the pattern. Further, sub-patterns can adopt (e.g., inherit) characteristics of the pattern within which they are included, unless overwritten by the sub-pattern. Parameter values for sub-patterns can be crafted in a manner by which they are passed to the sub-pattern from the parent pattern.

A pattern can also be included in more than one Pattern Kind. Such a pattern adopts the defined characteristics of each Pattern Kind for which it is a member to the extent that those characteristics do not conflict with one another. In the event that a characteristic from each Pattern Kind is in conflict, the pattern can adopt just one of those characteristics. In one embodiment of the present invention, a pattern will adopt the characteristic of the last associated Pattern Kind.

Plan 570 provides steps that are to be fulfilled before, during, and after generation of intentions from patterns. The plan provides a set of directions for how inputs for parameters and the like are combined with the pattern. Thus, the plan provides directions to a generator program for the way parameters and patterns are linked together given the inputs provided to the configurator.

In one embodiment of the present invention, a repository of patterns is developed for use by enterprises accessing computer resources in a cloud environment. Patterns within the repository are vetted in a manner that guarantees that software generated from the patterns will not be disruptive to users of the cloud environment. Further, the pattern in the repository can be approved for use for specific problem domains, and be made accessible only to approved users of those problem domains. Thus, security can be in place so that only "domain experts" having approval to generate new software within the domain can have access to patterns associated with that domain. Further, a domain expert of one domain may not have access to patterns associated with a different problem domain for which that use does not have privilege. Through the use of such a system, approved users can express intentions for desired software using patterns designed to facilitate expression of those intentions, and then provide those generated intentions to a software generator that outputs desired enterprise class objects, such as business objects, data objects, and user interfaces.

An Example Enterprise Server Architecture

Figure 6:
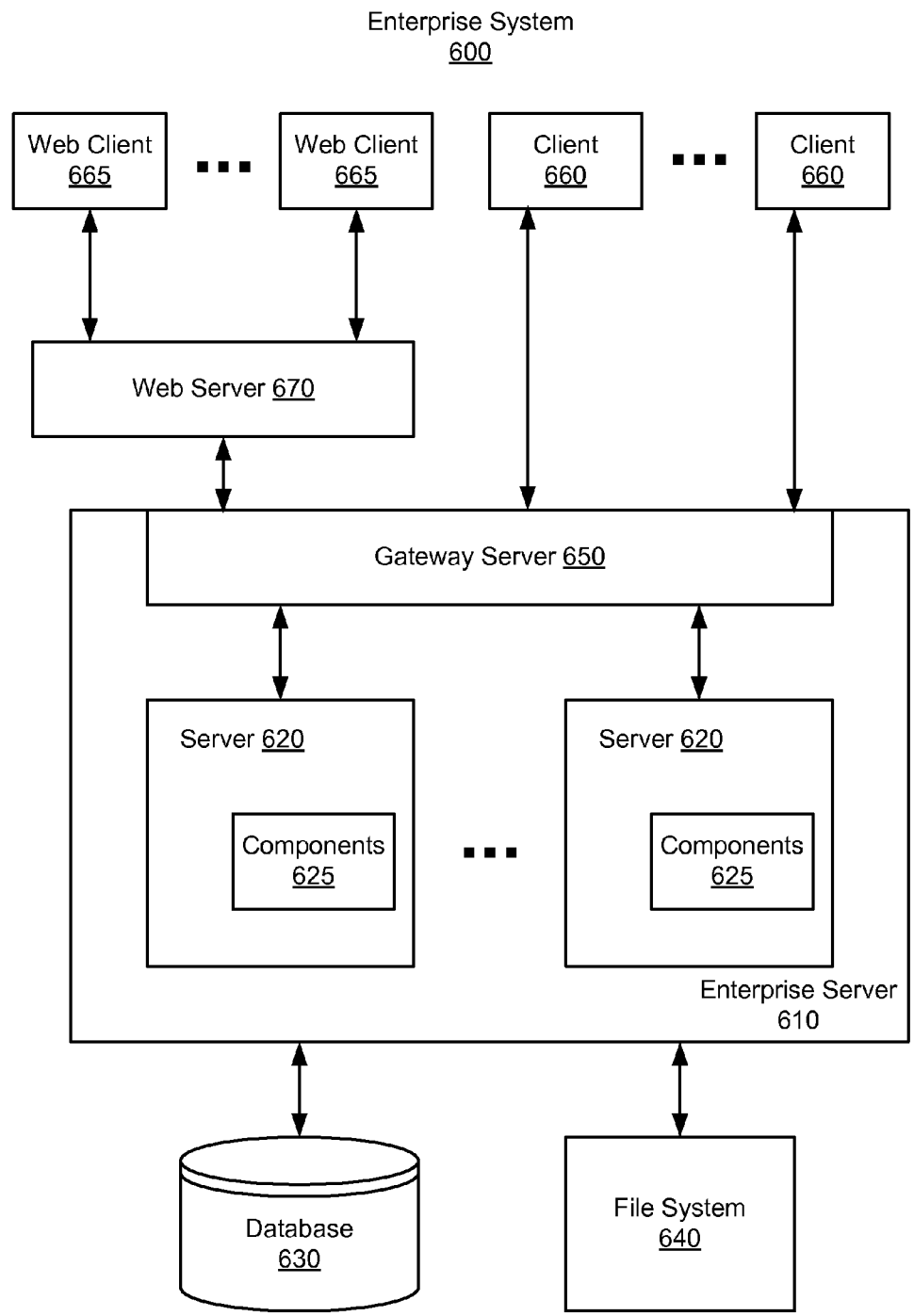
FIG. 6 is a simplified block diagram illustrating an enterprise server architecture usable in conjunction with embodiments of the present invention.

FIG. 6 is a simplified block diagram illustrating an enterprise server architecture usable in conjunction with embodiments of the present invention, including the software constructs described in connection with the simplified block diagram of FIG. 5. The illustrated enterprise server architecture includes an enterprise server 610 that is a logical grouping of one or more servers 620 that support a group of clients (e.g., clients 660 and 665) accessing a common database 630. An enterprise server can be configured, managed and monitored as a single logical group, allowing an administrator to start, stop, monitor or set parameters for servers 620 within enterprise server 610. In such a configuration, parameters for the enterprise system are set at the enterprise server level, and these parameters apply to every server operating within the enterprise server. In addition, other parameters can be adjusted at a server (e.g., a server 620) level to support fine tuning of those parameters. In this hierarchical parameter context, if a parameter is set at a server level, then the server-specific value for the parameter can override an enterprise server-level setting for the parameter. Further, parameter setting at a component level (process executed on servers 620) will override those set at the server level.

Servers 620 can be configured to support back-end and interactive processes for each client accessing the server. These processes are illustrated as one or more components 625 within each server. Servers such as servers 620 can support, for example, multi-process and multi-threaded components, and can execute components in background, batch, and interactive modes. A server component can also be executed on multiple ones of servers 620 simultaneously, in order to support an increased number of users and/or larger batched workloads. Examples of component processes include, for example, mobile web client synchronization, operation of business logic for web clients, connectivity and access to database and file systems for clients, integration with legacy or third-party data (e.g., data not native to the enterprise system), automatic assignment of new accounts, opportunities, service requests, and other records, and work flow management. Embodiments of the search processes of the present invention can also be implemented to execute on one or more of servers 620 as components.

Servers 620 are coupled to a gateway server 650, illustrated as part of enterprise server 610. Gateway server 650 coordinates the operations of enterprise server 610 and servers 620. Such a gateway server can provide persistent storage of enterprise server configuration information, including, for example, definitions and assignments of component groups and components, operational parameters, and connectivity information. A gateway server can also serve as a registry for server and component availability information. For example, a server within enterprise server 610 (e.g., one of servers 620) can notify gateway server 650 of availability. Connectivity information such as network addresses can be stored in a storage accessed by gateway server 650. If one of servers 620 shuts down or otherwise becomes unavailable, connectivity information related to that server can be cleared from gateway server 650.

Through their relationship in enterprise server 610, servers 620 and their components 625 are able to access one or more data sources (e.g., databases 630 and file systems 640). Database 630 can store, for example, RDBMS client software and tables, indexes, and data related to all operations impacted by the enterprise system. Such database information can include, for example, customer information, market data, historical pricing information, current pricing information, contact information, and the like. Similarly, file system 640 can store data and physical files used by clients 660 and 665 and enterprise server 610. File system 640 can be a shared directory, or set of directories on different devices, which is network-accessible to all servers 620 in enterprise server 610. In order for a client to gain access to files in file system 640, a client can connect to an appropriate one of servers 620 to request file uploads or downloads. The server is then able to access file system 640 using, for example, a file system management component.

As stated above, embodiments of the processes of the present invention can be implemented to execute as components on one or more of servers 620. These servers can form or be part of a private or public cloud computing environment. An alternative embodiment provides a separate server accessible by the same or different web server.

Clients 660 and 665 provide access to enterprise server 610 for agents using the enterprise system. Clients communicate to enterprise server 610 through gateway server 650 either directly (e.g., client 660) or via a web server 670 (e.g., clients 665). A web server 670 provides a mechanism by which enterprise server 610 can respond to web-based requests (e.g., HTML, XML, and the like). Web clients 665 can include clients coupled to web server 670 via a local area network, metro area network, or wide area network and propagated over a variety of communications media, as discusses above. Further, web clients 665 can include mobile clients accessing web server 670 through wireless communications means. Users of clients 660 and web clients 665 can include, for example, sales agents, service agents, customer representatives, managers of the business entity, and the like. Users have access to all information accessible to enterprise server 610 in database 630, as controlled by a user's secured access rights.

Clients 660 and web clients 665 can be distributed throughout an enterprise and can include hundreds or thousands of such clients. Each such client can perform tasks related to either creating new records to be stored in, for example, database 630, modifying records in database 630, or searching for information stored in database 630.

Figure 7:
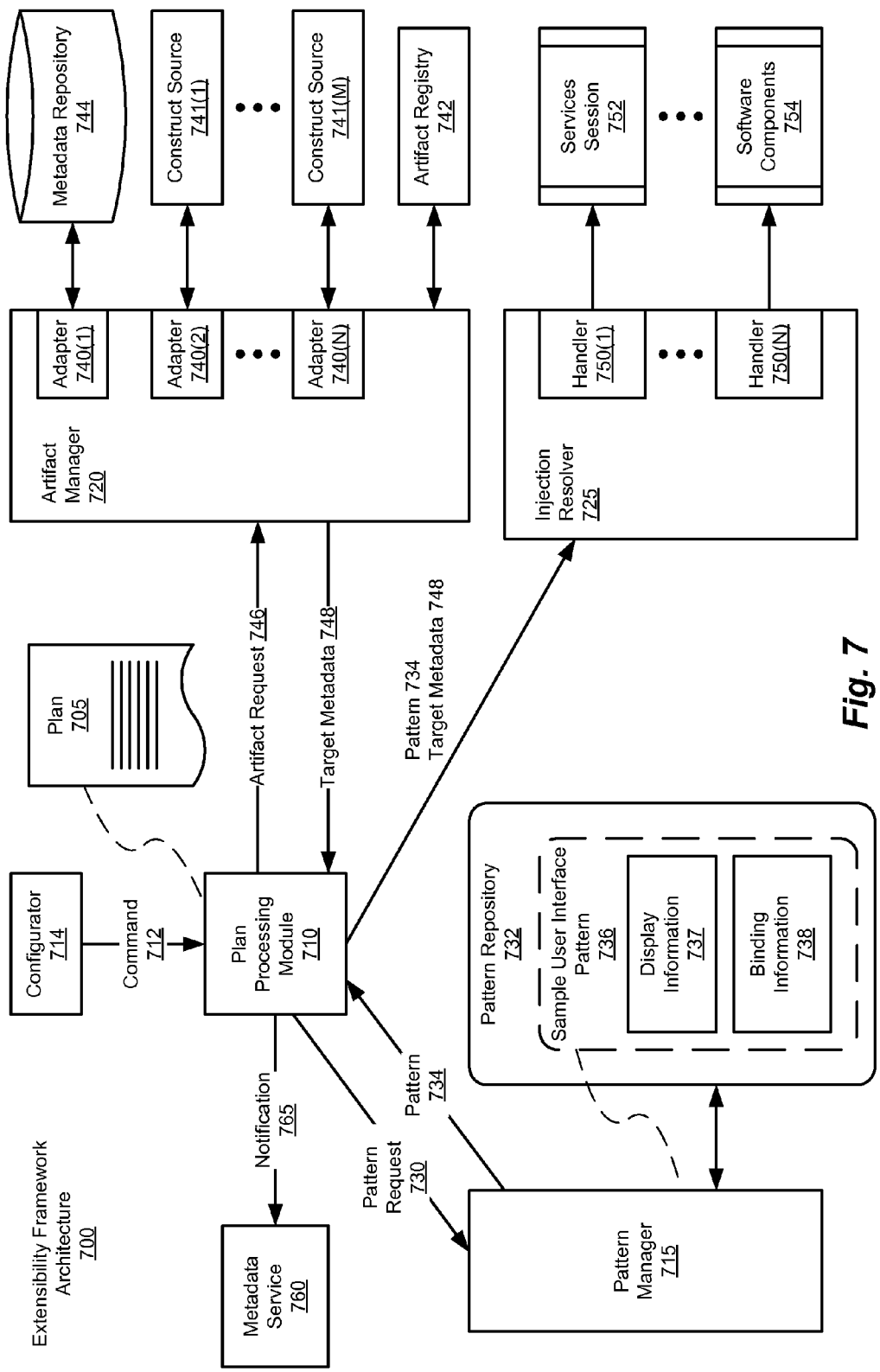
FIG. 7 is a block diagram illustrating various elements of an extensibility framework architecture according to embodiments of the present invention.

An Example Implementation of an Intentional Programming Model in an Extensible Cloud Programming Environment FIG. 7 is a block diagram illustrating the various elements of an extensibility framework architecture according to embodiments of the present invention (depicted in FIG. 7 as an extensibility framework architecture 700). Central to the operation of extensibility framework architecture 700 is a plan 705. Plan 705 specifies (or, in certain embodiments, facilitates the identification of) operations that are to be performed and/or directed by the architecture's plan processing module (depicted in FIG. 7 as a plan processing module 710).

Plan 705 is typically determined, at least in part, based on a command 712 received by plan processing module 710, and which, for example, is received from a configurator 714. Configurator 714 is a configuration tool tailored to the needs of untrained users (e.g., self-service programmers), and allows such users to add new software components to an existing application, or modify the software components existing therein.

A plan (e.g., plan 705) specifies one or more operations, typically in a sequence of some sort, to be performed in giving effect to the given command. In certain embodiments, each operation specified by a plan is carried out through an executor class.

For example, a command "CreateAttribute" might have a plan that specified the following operations:

1. Allocate an available attribute.
2. Identify the target metadata and artifact into which the pattern is to be injected.
3. Compose a pattern for the new attribute.
4. Inject the new pattern into the target metadata.

A further example of the operations, as well as the functionalities facilitated by a plan according to embodiments of the present invention is discussed in greater detail in connection with FIG. 12.

Upon receipt of command 712, plan processing module 710 refers to mapping information (e.g., a command registry (not shown)), which includes information mapping command 712 to plan 705 (and vice versa). It will be appreciated that a command can map to more than one plan, and conversely, more than one command can map to a given plan. Thus, relationships between commands and plans can be 1:N, 1:1, or N:1, as well as combinations thereof. Once plan 705 has been identified, the operations outlined by the plan are identified and, if possible and appropriate, carried out.

As will be appreciated in light of the present disclosure, a command such as command 712 is implemented as an XML fragment that contains configuration options that can be used in creating and injecting a pattern, in certain embodiments. Further, a set of such commands can be maintained in a command configuration file, for example.

The foregoing command paradigm serves as the self-service programmer's primary interface to extensibility framework architecture 700. Preferably, a command according to embodiments of the present invention should be a generic and lightweight mechanism, in order to enable a caller (e.g., a configurator such as configurator 714, or the like) to generate and inject new patterns easily and efficiently.

In order to perform the operations necessary to creating and injecting a pattern (and so support the extensibility of the software components in question), extensibility framework architecture 700 provides a pattern manager 715, an artifact manager 720 and an injection resolver 725. In response to a pattern request 730, pattern manager 715 accesses a pattern repository 732. In certain embodiments, pattern repository 732 (also referred to herein as a component repository) is a collection of pre-built components available for application building. In addition, if necessary, one or more pattern composition operations can be performed. As noted elsewhere herein, pattern composition refers to the process of composing semantic-rich patterns from other (typically more basic) patterns. As described elsewhere herein, this ability to create more complex patterns by aggregating simpler patterns further enhances the extensible nature of extensibility framework architecture 700, and is discussed in greater detail in connection with FIG. 8.

Having identified (and/or composed, as the case may be) one or more patterns that satisfy pattern request 730, pattern manager 715 returns the pattern(s) thus identified or composed (depicted in FIG. 7 as a pattern 734). In the example depicted in FIG. 7, a sample user interface pattern 736 is presented as an example of such a pattern. Sample user interface pattern 736 includes display information 737 and binding information 738. Display information 737 can be implemented as a display template, and can include information specifying the look-and-feel of sample user interface pattern 736, for example. Binding information 738, similarly, can also employ a display template, and can include information specifying the manner in which sample user interface pattern 736 interacts with the given data model, for example. Examples of elements comparable to display information 737 and binding information 738 are provided in connection with FIG. 8.

Pattern manager 715, as part of providing pattern 734, may need to perform pattern composition. Pattern composition refers to the process of composing a more complex, semantic-rich pattern from more basic patterns. In the manner previously described, a pattern is a reusable building block that adheres to a specific semantics and use-cases. A pattern is similar to a component, but with at least one distinction: Typically, a component is built for a wide range of uses, while a pattern is typically built for a few specific use-cases. As such, a component typically provides a rich set of configurable options in adopting such usage scenarios. By distinction, a pattern has an inherent semantic that reduces its complexity in terms of configurability. The inherent semantic in a pattern can be signified through its structure, as well as its predefined behaviors, whereas these structures and behaviors are typically configurable in a component. It will be appreciated, however, as used herein, the term pattern is intended to convey the possibility of the use of a component (as is intuitively the case, given that a pattern is, for purposes of this disclosure, simply a component having an inherent semantic that simplifies its use, at the expense of reduced configurability).

As will be described further in connection with FIG. 8, a pattern can belong to one or more PatternKinds. Each PatternKind contributes to the externalized contract in using the given pattern. The externalized contract includes a set of properties that signify the configuration option(s) for the pattern. A pattern can have one or more aspects, with such each aspect satisfying a certain requirement in materializing the pattern. The pattern's PatternKind specifies the aspects that a pattern of that PatternKind can have. Each aspect, in turn, includes a content provider that provides the actual content for that aspect. A content provider can employ one or more templates in assembling the actual content. Such templates may specify a property, which is a configuration option used by the template. Typically, a property name is an alphanumeric string (preferably not case sensitive), and a default value can be specified with a property (e.g., a literal string). Another possible characteristic of a pattern is the annotation. An annotation gives semantic meaning to a pattern. For example, if the pattern is used for generating a detail table, then this information can be captured in the annotation. The annotation can be used later in generating artifacts for this pattern (e.g., as the pattern is created).

Another feature of extensibility framework architecture 700 depicted in FIG. 7 is artifact manager 720. Artifact manager 720, among other elements, includes a number of adapters (depicted in FIG. 7 as adapters 740(1)-(N)). As depicted in FIG. 7, adapters 740(1)-(N) allow artifact manager 720 to access various sources of programmatic constructs, such as metadata, artifacts and the like (examples of which are depicted in FIG. 7 as construct sources 741(1)-(M)). As described in further detail subsequently, an artifact is an abstraction that imbues a piece of a runtime metadata with a meaning. Among other characteristics and capabilities, an artifact can provide the requisite abstraction to allow retrieval of properties from runtime metadata.

Alternatively, artifact manager 720 can be designed to access construct sources directly (thus making the aforementioned adapters optional). Artifact manager 720 can also be designed to access other information directly, such as various registries (an example of which is depicted in FIG. 7 as an artifact registry 742). However, as depicted in FIG. 7 (and noted above), adapters 740(1)-(N) interface artifact manager 720 not only to construct sources 741(1)-(M), but also to an example of such construct sources, a metadata repository 744. As depicted therein, artifact manager 720 accesses metadata repository 744 via adapter 740(1), and construct sources 741(1)-(M) via adapters 740(2)-(N). It will be appreciated that, while depicted as having 1:1 relationships, the adapters and construct sources employed may, in fact, also have one-to-many, many-to-one, or many-to-many relationships, and/or some combination thereof, in a given implementation. In the scenario depicted in FIG. 7, however, it will be appreciated that each of adapters 740(1)-(N) interfaces artifact manager 720 to a given construct source (i.e., metadata repository 744 or one of construct sources 741(1)-(M)).

As will be appreciated in light of the present disclosure, artifact registry 742 maintains artifacts, as well as information associated therewith, available for use in extensibility framework architecture 700. As will be further appreciated in light of the present disclosure, the artifacts in artifact registry 742 will be configurable (i.e., customizable), in at least some regard, and so facilitate the injection process thereby. Similarly, metadata repository 744 maintains metadata associated with the artifacts (e.g., target metadata 748). It will be understood that metadata repository 744 is merely an example of the various artifact repositories that can be made available to artifact manager 720, and further, that such artifact repositories support the functionalities made available to self-service programmers via an application development framework such as that described in connection with FIG. 13.

When artifact manager 720 receives an artifact request from plan processing module 710 (depicted in FIG. 7 as an artifact request 746), artifact manager 720 accesses the data sources that are made available via the adapters (e.g., artifact registry 742 and metadata repository 744), in order to identify, access and provide the requested information in response to artifact request 746 from plan processing module 710 (that being information including the requested artifact and associated metadata (depicted in FIG. 7 as target metadata 748)). Among other constructs included (or potentially included) in the various artifact registries available to artifact manager 720 in a given configuration are aggregations of artifacts. Certain aggregations of artifacts are referred to herein as partitions. A partition is a collection of the configuration artifacts (such as patterns and plans) that are specific to an application domain. In certain embodiments, a partition is identified by a filename and filesystem directory. Configuration files placed in a partition's filesystem directory will belong to that partition. The operation of artifact manager 720, as well as further associated elements and additional features thereof, is discussed in greater detail in connection with FIG. 9.

With the requested pattern (pattern 734) and requisite metadata (target metadata 748) now available, plan processing module 710 is able to proceed with the operations identified by plan 705, and provide the requested pattern and metadata to injection resolver 725. An injection resolver (also referred to herein as a pattern resolver), such as injection resolver 725, determines the pattern(s) to be generated, which, in turn, depend(s) on the inputs received thereby (e.g., pattern 734 and target metadata 748). For example, based on the given command, one or more attribute types and the target artifact, a specific one of a number of patterns can be selected for injection.

More specifically, pattern injection refers to the process of injecting a pattern into existing artifacts (thereby allowing a self-service programmer to customize an artifact, for example), as well as creating new artifacts from the materialized pattern (thereby allowing a self-service programmer to create artifacts within the universe defined by the pattern's pattern programmer, for example). Thus, a pattern (e.g., pattern 705) is injected into an artifact's runtime metadata (e.g., target metadata 748). As noted elsewhere herein, runtime metadata refers to the metadata used in the software components of the runtime system. For example, in one implementation, the runtime metadata and resulting software components are a collection of software files (e.g., application development framework files) created for the application in question. In such an implementation, each piece of runtime metadata is referenced by a unique name. Thus, the content of the runtime metadata can be retrieved from a metadata repository (e.g., metadata repository 744), using that runtime metadata's unique name.

As noted earlier, an artifact is an abstraction that imbues a piece of a runtime metadata with a meaning. In one implementation, an example of an artifact is a Frame. A Frame is a user interface artifact that corresponds to an area within a user interface page. A MasterRegion is a Frame that can be mapped to a FormLayout element within a page. A FormLayout element is a container for the fields to be displayed for the master object.

In such a scenario, an artifact would then carry the following information:
1. Name The name of the artifact.
2. Kind This describes what kind of artifact it is (e.g., Frame).
3. Purpose This describes what this artifact means (e.g., MasterRegion).
4. ApplyTo This describes the context in which this artifact applies.
5. Descriptors Each descriptor is a name-value pair that describes a property of that artifact (e.g., label, validator, or the like).

As noted above, the ApplyTo information indicates the context in which an artifact applies. For example, a Frame artifact is used for displaying the fields for an Entity (e.g., Opportunity). The context (Opportunity) gives additional meaning to this Frame artifact.

Further, an artifact can have multiple aspects, in a manner comparable, at least in concept, to that of a pattern. Each aspect captures the mapping between an artifact and the corresponding runtime metadata. An artifact aspect can include the following information, for example:
1. Runtime Metadata Name—This is used for retrieving the content of the runtime metadata from the metadata repository.
2. Locator—The locator describes how to locate this artifact within the runtime metadata. In the case of XML-based metadata, for example, the locator can be an xpath expression.

When injecting a pattern into an artifact's metadata, information regarding the point in the artifact's metadata at which the pattern is to be injected is typically needed, and is referred to herein as a pointcut. A pointcut specifies the insertion point of a pattern being injected into an artifact. It is noted here, however, that such need not be the case, as the automatic identification and location of pointcuts is within the scope of the present disclosure. Such automatic identification and location can be achieve though techniques such as the recognition of pattern in the runtime metadata, use of historical information as to where such patterns have been injected in the past, and other such automated techniques.

In one implementation, a pointcut can include, for example, the following information:
1. Name—a unique name to identify the pointcut.
2. Operator—a pointcut operator that specifies how to insert the pattern into the artifact.
3. Injector—an injector that is an implementation class for executing the insertion. This class can be identified in the pointcut information, or can actually be included in the information itself.

With regard to the Operator pointcut information, examples of pointcut operators thus identified include "Insert," "After," "Before" and "InsertSort." "InsertSort" instructs injection resolver 725 to insert the pattern in a relative position among existing elements in the runtime metadata. Each pointcut operator can be associated with a specific aspect. For example, for the aspect DisplayAspect, the "InsertSort" pointcut operator could be used, while for the aspect BindingAspect, the "Insert" pointcut operator might be employed.

In extensibility framework architecture 700, for a pattern to be injected into an artifact by injection resolver 725, the following pieces of information are needed:
1. The artifact in which the pattern is to be inserted.
2. The pattern to be injected.
3. The pointcut for determining how the insertion is to be performed.

In the implementation presented as extensibility framework architecture 700, the following operations are performed during injection:
1. Select an aspect in the pattern.
2. Retrieve the generated content from the pattern for the selected aspect.

3. Retrieve the runtime metadata from the artifact for the selected aspect. The runtime metadata can be retrieved using the locator for the selected aspect.
4. Retrieve the pointcut operator for the selected aspect.
5. Invoke the injector to insert the generated content into the runtime metadata.

As noted earlier, artifacts can also be generated in extensibility framework architecture 700. To perform artifact generation with a given pattern, a special pointcut is used to create the new artifact. In such a scenario, the given pattern needs to be properly annotated, such that the new artifact can be generated from the pattern's annotation.

Injection resolver 725 includes, among other elements thereof, a number of handlers (depicted in FIG. 7 as handlers 750(1)-(N)). Handlers 750(1)-(N) facilitate interactions between injection resolver 725 and various other system elements of extensibility framework architecture 700, and thereby provide the functionality needed to modify the software constructs being customized. For example, handler 750(1) allows injection resolver 725 to interact with a services session 752. Similarly, handler 750(N) allows injection resolver 725 to interact with the various software components 754 being modified. In supporting such functionality, handlers 750(1)-(N) allow injection resolver 725, after having received target metadata 748 and pattern 734, to inject pattern 734 into target metadata 748 and provide the customized metadata to one or more of software components 754. In performing the foregoing operations and making the customized constructs available, plan processing module 710 communicates with a metadata service 760, for example, by providing notifications and other information to metadata service 760 (an example of which is depicted in FIG. 7 as a notification 765). It will also be appreciated, however, that metadata service 760 can support the functions associated with plan processing module 710 directly, and so encompass the processing of plan 705.

Figure 8:
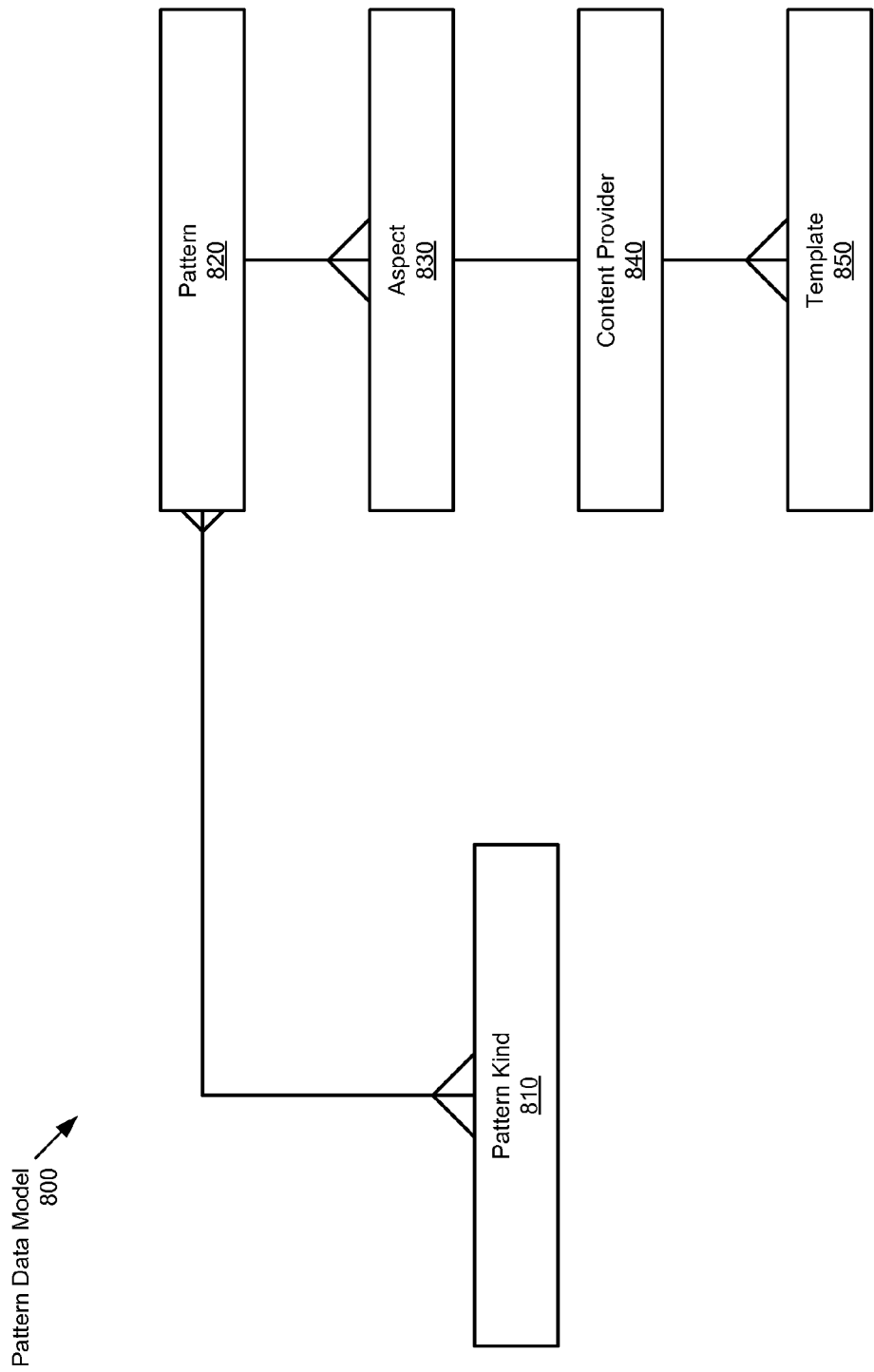
FIG. 8 is a simplified block diagram illustrating a data model according to embodiments of the present invention.

FIG. 8 is a simplified block diagram of a pattern data model 800, depicting a data model according to embodiments of the present invention. As will be appreciated in light of the present disclosure, pattern data model 800 is, in at least certain features and functionalities, comparable to the software constructs described in connection with the simplified block diagram of FIG. 5, as well as the patterns described elsewhere herein. Pattern data model 800 includes a pattern kind 810, a pattern 820, an aspect 830, a content provider 840, and a template 850. As will be appreciated from the structure illustrated in FIG. 8, in fact pattern kind 810 and pattern 820 have a many-to-many relationship, meaning that a pattern kind such as pattern kind 810 can comprehend a number of patterns, among then pattern 820. Similarly, a pattern such as pattern 820 can comprehend (i.e., be a member of) one or more pattern kinds (e.g., pattern kind 810). In a similar fashion, as depicted in FIG. 8, pattern 820 may have one or more aspects (e.g., aspect 830). However, an aspect such as aspect 830 has a one-to-one relationship with its content provider (e.g., content provider 840). A current provider such as content provider 840, however, can have a one-to-many relationship with its template(s) (e.g., template 850).

The primary function of a pattern kind (also referred to by its class name of PatternKind), such as pattern kind 810, is to enforce uniformity among patterns of the same "kind." In that regard, a PatternKind serves two purposes:
1. Specifying the common specifications and resources sharable among the patterns; and
2. Specifying the external contract in using the patterns (as s set of Properties).

Examples of PatternKind are UIPatternKind and DataPatternKind. A PatternKind can be derived from a parent ParentKind. For example, a TextUIPatternKind can be derived from UIPatternKind. A child PatternKind can inherit the resources of the parent PatternKind. In one implementation, the following characteristics can be specified in a PatternKind:
1. Property Set. A property set is a collection of properties, along with the default values for these properties. A pattern will automatically inherit these properties from its PatternKind. The pattern can override the default values for the property set.
2. Enumeration. An enumeration contains a list of string literals. A property can refer to an enumeration for specifying its set of possible values.
3. Aspect Set. An aspect set is a collection of aspects that a pattern can have.

A pattern can belong one or more PatternKind. If a pattern has more than one PatternKind, then these PatternKinds are specified in a list, and the following rules apply in resolving conflicts between the PatternKinds:
1. If two PatternKinds form a hierarchy, then the resources of the child PatternKind takes precedence.
2. If two PatternKinds do not form a hierarchy, then the resources of the latter PatternKind in the list takes precedence.

An aspect specifies a certain requirement in materializing the given pattern. One such requirement can be the physical representations of a pattern in the target domain. A user interface pattern (e.g., sample user interface pattern 736) may have two aspects, a Display Aspect (e.g., display information 737) and a Binding Aspect (e.g., binding information 738). The Display Aspect specifies the look-and-feel of the pattern. The Binding Aspect specifies the manner in which this pattern interacts with pattern data model 800. The Display Aspect and Binding Aspect each have their own physical representation (e.g., XML schema). Each aspect has its corresponding content provider to specify how to generate the content for the particular representation.

In certain implementations, a content provider such as content provider 840 is a Java class that controls the manner in which content is fabricated for a certain aspect. Typically, content provider 840 generates the requisite content using one or more templates. In such implementations, a template can be, for example, an XML document that contains the partial implementation of the content in question. Alternatively, content provider 840 can also generate the content programmatically.

A more specific example of a template is a template content provider. A template content provider is a content provider that generates content based on a template. A template content provider can contain switching logic, capable of determining which template to use, depending on the situation. For example, if an InputText pattern is being created and the target container is a table, the content provider can choose whether or not to use a template that wraps the InputText user interface control under a column element.

In certain embodiments, the output of a content provider is a content object. Such content objects are self-descriptive objects that contain not only the generated content, but also additional information about the content. As an example, a content object can contain the following information:
1. The generated content;
2. The implementation type; and
3. The aspect for which the content is being generated.

The implementation type identifies the implementations used for this content. For example, an implementation type can be "DOM" (indicating the document object model convention) for XML content. In such an implementation, the implementation type, if missing, is defaulted to the class name of the actual content.

A template is a specification of a pattern's content for a specific aspect. For example, a template can be used to specify XML-based content. Examples of the forms in which the content of a pattern can be represented in a template include:

1. Language Specific Literals. Such literals are, essentially, the textual fragments that are specific to the target representation. For example, considering the case of an ADF-based pattern, the literals would be ADF constructs embedded in the template.
2. Variables. Variables are symbols whose values can be substituted when the template is materialized. Variables are generally reference to the pattern's input properties or template parameters.
3. Sub-Patterns. A template itself can embed other sub-patterns.
4. Conditionals. Conditionals are switching conditions within the template. Such conditions can be based on the input properties and template parameters, for example.
5. Sub-Templates. A template itself can embed a sub-template. Such a sub-template will belong to the same aspect in the same pattern.

Each template is essentially an extension of the constructs of the underlying target representation. In the case of an ADF, a user interface template (e.g., such as that which would be used with sample user interface pattern 736) would contain specific layout and visual requirements for the application in question (e.g., a CRM application).

A template may also declare one or more parameters. Such parameters can be used as variables in the template's text. The template parameters are typically used when the template can be embedded in another template of the same aspect. The template parameters enhance the reusability of the template.

An example of a template with a variable and a condition appears below:

```
InputTextDisplayTemplate
    <af:inputText ...
        rendered="true"
        maximumLength="$$maximumLength$$"
        #if test="$$required$$"
            required="true"
        #else
            required="$$pBindings$$".$$attributeName$$.required"
    ...
```

An example of a template with a sub-template appears below:

```
ColumnInputTextDisplayTemplate
    <af:column ...
        #expand template="InputTextDisplayTemplate"
            pBinding="row.bindings"
    ...
```

As a pattern is materialized, its sub-patterns are expanded into concrete contents. As will be appreciated, in light of the present disclosure, several approaches can be used to include a sub-patterns in a parent pattern, including, for example:

1. Simple inclusion. In this approach, the sub-pattern is directly specified in the parent template. This is similar to template inclusion, except the target is a pattern instead of a template.
2. Dynamic inclusion. In this approach, a collection of objects is specified in the parent template. For each object in the collection, based on its class, a Pattern Resolver can be invoked to determine the actual sub-pattern to use for that object. In addition, given the object, a Context Factory can be invoked to generate a generation context can be used in pattern binding. Following sections will discuss generation context further more.
3. Metadata inclusion. This approach acts as a special case of dynamic inclusion, in which the object is a metadata object. In this case, a special syntax is provided to support metadata inclusion.

When embedding a pattern within a template, the content provider checks to ensure that the implementation type of the embedded content is compatible with the containing template. When materializing a pattern, the context in which such operations are performed is typically needed. Such a context is referred to herein as a generation context. The generation context is the set of resources available when the pattern is materialized. These available resources are accessible in the template as variables.

A generation such as that just described can include, for example:

1. The values of the pattern properties;
2. The payload of the event; and
3. An identifier generator, which can also be used to generate the customization identifier in the template.

When materializing a pattern, it may also be desirable to provide for context binding. For example, when including a pattern inside a template, the parent's generation context can be bound to the sub-pattern. The property values of a sub-pattern can be bound from the parent, for example, in the following order:

1. Pattern Kind. The default property values from the pattern kinds are applied to the sub-template.
2. Implicit. The sub-pattern will automatically inherit the parent's generation context. For example, if the pattern requires a property called "ReadOnly" and the parent's generation context contains such a property, the value of "ReadOnly" in the parent's generation context will be bound to the sub-pattern. Note that the property "ReadOnly" should be an input property of the sub-pattern in order for this property to be used as a variable in the template.
3. Explicit. When binding to a sub-pattern, the parent template can explicitly specify the values of the input property of the sub-pattern. The explicit value can be a literal or an expression, for example. If explicit value is an expression, the expression may reference the property in the parent's generation context. The explicit binding is considered to be stronger because explicit binding is part of the behavioral specification of the pattern.
4. Pass-thru. If the parent's generation context contains a property that is not an input property of the sub-pattern, then this property is marked as pass-through. This means that this property cannot be referenced in the template, but it is available when this property is bound to any embedded pattern within the sub-pattern ("sub-sub-pattern").

When using polymorphic inclusion, a template context can be created for each object in the polymorphic collection.

These object-level template contexts are bound after simple binding is done. Also, as will be appreciated, it is important that any cycles in the parent/child relationships that may exist in more complex patterns when expanding those patterns be detected (e.g., in order to avoid a sub-pattern including its parent). Further, extensibility framework architecture 700 supports the use of a common namespace, which can be implemented, for example, as a common namespace file. Such a common namespace file can be specified such that a template can import the file, in order to specify the namespace (and namespace prefix) of the element(s) in the template.

Figure 9:
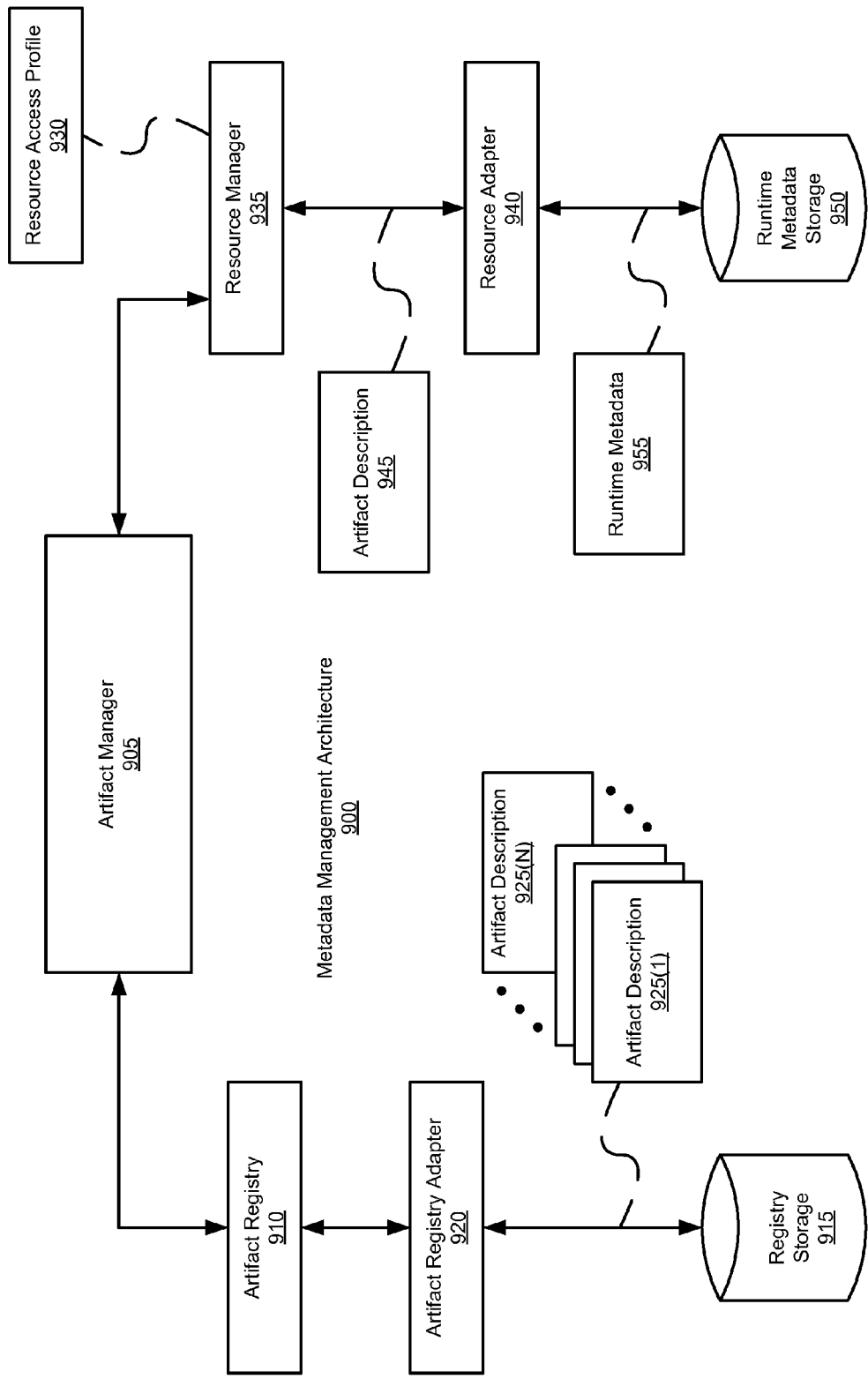
FIG. 9 is a block diagram illustrating a metadata management architecture according to embodiments of the present invention.

FIG. 9 is a block diagram illustrating a metadata management architecture 900, according to embodiments of the present invention, which is an example of an architecture capable of providing the functionality represented by artifact manager 720 and its associated elements in FIG. 7. In an extensibility framework according to embodiments of the present invention, metadata management addresses two primary uses of the runtime metadata managed thereby. The first of these is the use of the runtime metadata as the content into which a new pattern is injected, an operation performed primarily in the injection phase. The second of these is the use of the properties associated with the runtime metadata to reflect the configuration choices for the artifact in question (i.e., a specific artifact). Examples of such properties are labels, required flags, and validators. Typically, the extensibility framework (i.e., extensibility framework architecture 700) does not duplicate properties that already exist in the runtime metadata. Moreover, the extensibility framework can also store additional metadata, if that additional metadata is not available in the runtime metadata. This functionality enables the same infrastructure to be used in customizing an existing artifact, as well as creating a new artifact.

Among other functionalities provided by metadata management architecture 900 is metadata reflection (in the manner of the reverse-translation mentioned earlier herein). As noted earlier, an artifact is an abstraction that imbues a piece of a runtime metadata with a meaning, and can also provide information that allows properties to be retrieved from runtime metadata. FIG. 9 depicts various elements within extensibility framework architecture 700 that support metadata reflection.

Central to metadata management architecture 900 is an artifact manager 905, which is comparable, in at least certain of its features and functionalities, to artifact manager 720 of FIG. 7. Artifact manager 905 is designed to access both artifact information and metadata via facilities provides by metadata management architecture 900. Artifact manager 720 acts as the entry point from which other components within extensibility framework architecture 700 can retrieve information regarding a given artifact, such as an artifact description (described below). With respect to such artifacts, artifact manager 905 accesses an artifact registry 910, which, in turn, provides access to artifact registry storage 915 via an artifact registry adapter 920.

In response to this request, artifact registry storage 915 provides one or more artifact descriptions, depicted in FIG. 9 as artifact descriptions 925(1)-(N), to artifact registry 910 via artifact registry adapter 920. Artifact descriptions 925(1)-(N) can be implemented, for example, as a class that represents the information about an artifact. In fact, a list of artifacts can be obtained from artifact registry 910. Artifact registry 910, typically, maintains artifacts for only the runtime metadata that is extensible. Artifact registry 910 uses artifact registry adapter 920 to retrieve the requisite information (e.g., a list of artifacts) from its physical storage (i.e., artifact registry storage 915). As will be appreciated, artifact registry 910, artifact registry adapter 920 and artifact registry storage 915 are comparable, in at least certain respects of their functionality, to artifact registry 742 of FIG. 7. The output of artifact registry 910 is a list of artifact descriptions (artifact descriptions 925(1)-(N)). In certain embodiments, artifact descriptions 925(1)-(N) contain only basic information about the artifacts (e.g., artifact name(s), artifact kind(s), artifact purpose(s) and the like).

Once artifact descriptions 925(1)-(N) have been retrieved, artifact manager 905 proceeds with retrieving the requisite metadata for the injection process. Each artifact kind in artifact descriptions 925(1)-(N) maps to a resource access profile (an example of which depicted in FIG. 9 as a resource access profile 930). For each artifact description returned from artifact registry 910, then, the given artifact description's resource access profile (e.g., resource access profile 930) is identified and used by a resource manager 935 in accessing the appropriate runtime metadata storage. It will be appreciated that, in light of the present disclosure, an artifact may be mapped to multiple resources, with each resource designed to manage a subset of the artifact's properties (e.g., label(s), validator(s) or other such properties).

For each resource, metadata management architecture 900 typically includes a corresponding resource adapter that is responsible for retrieving the properties from the resource's runtime storage (an example of which depicted in FIG. 9 as a resource adapter 940), though other arrangements are within the scope of this disclosure (e.g., a resource adapter that supports multiple runtime metadata stores). A resource adapter such as resource adapter 940 returns an artifact's properties in the form of a resource description, on a per-artifact basis (an example of which is depicted in FIG. 9 as an artifact description 945). In a manner comparable to that described with the other artifact descriptions of extensibility framework architecture 700, artifact description 945 can be implemented, for example, as a class that represents the information about an artifact. Resource adapter 940 accesses runtime metadata storage 950 to retrieve the desired runtime metadata (depicted in FIG. 9 as runtime metadata 955). As will be appreciated, resource manager 935, resource adapter 940 and runtime metadata storage 950 are comparable, in at least certain respects of their functionality, to adapter 740(1) and metadata repository 744 of FIG. 7.

Artifact manager 905 then merges the resource descriptions received from the artifact registry (e.g., artifact descriptions 925(1)-(N)) and resource manager 935 (e.g., artifact description 945). The merged resource descriptions are now ready to be returned to the module of extensibility framework architecture 700 that invoked artifact manager 905 (e.g., plan processing module 710, metadata service 760, or other module of extensibility framework architecture 700 tasked with interfacing with artifact manager 905). In the case in which a new artifact has been created, artifact manager 905 is also responsible for saving this artifact into artifact registry 910.

Resource manager 935 can also be employed to remove one or more artifacts from the runtime metadata (e.g., the runtime metadata in runtime metadata storage 950). In certain embodiments, for example, an artifact stores a set of locators for each of its aspects. Each of these locators identifies where the artifact resides in the runtime metadata. For each such locator, the artifact kind is identified. Based on the artifact kind, a resource access file is obtained. As noted earlier, a resource adapter can be identified for each resource identified by the resource access file. This facilitates the identification of the resource adapter for the given resource. Once the resource adapter in questions has been identified thusly, a "delete" operation can be invoked in the resource adapter using the corresponding locator. The resource adapter then executes the "delete" operation on the underlying metadata storage (i.e., runtime metadata storage 950). For example, using the metadata services example presented in FIG. 7, the resource adapter simply deletes the artifact in question.

In certain embodiments, a command log (not shown) may be maintained as part of metadata management architecture 900, or elsewhere within extensibility framework architecture 700. Such a command log maintains information regarding the creation, modification, and so on, performed for each artifact created, modified, etc., in extensibility framework architecture 700. In so doing, a history of these operations is kept, allowing a determination to be made as to the manner in which the affected artifacts are extended or otherwise altered. In the case of a system upgrade, such a command log allows an artifact to be regenerated based on the commands kept in the command log.

Figure 10:
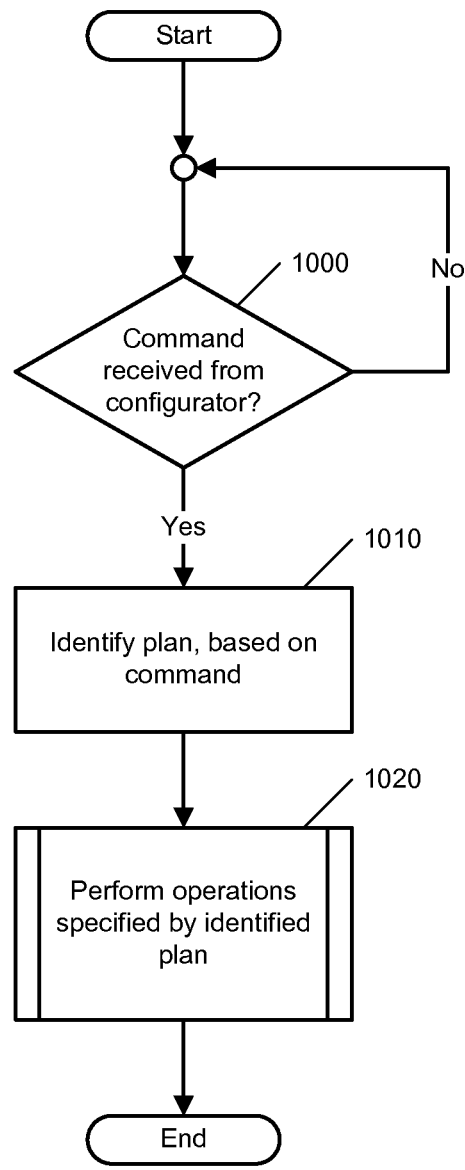
FIG. 10 is a flow diagram illustrating an example of operations performed by an extensibility framework architecture according to embodiments of the present invention.

FIG. 10 is a flow diagram illustrating an example of the operations which can be performed by an extensibility framework architecture such as extensibility framework architecture 700, according to embodiments of the present invention. The process begins with the plan processing module of the extensibility framework architecture awaiting a command from the configurator (step 1000). Once a command has been received from the configurator (step 1000), a plan (e.g., plan 705 of FIG. 7) is identified, based on the command received (step 1010). As noted earlier, the given plan(s) can be determined using a command registry, in which a plan is determined based on the command received, for example. Once the plan(s) to be implemented is (are) thus identified, the operations specified thereby are performed, as necessary and appropriate (step 1020). The process of performing the operations specified in the identified plan is detailed further in connection with the description of FIG. 11, below.

Figure 11:
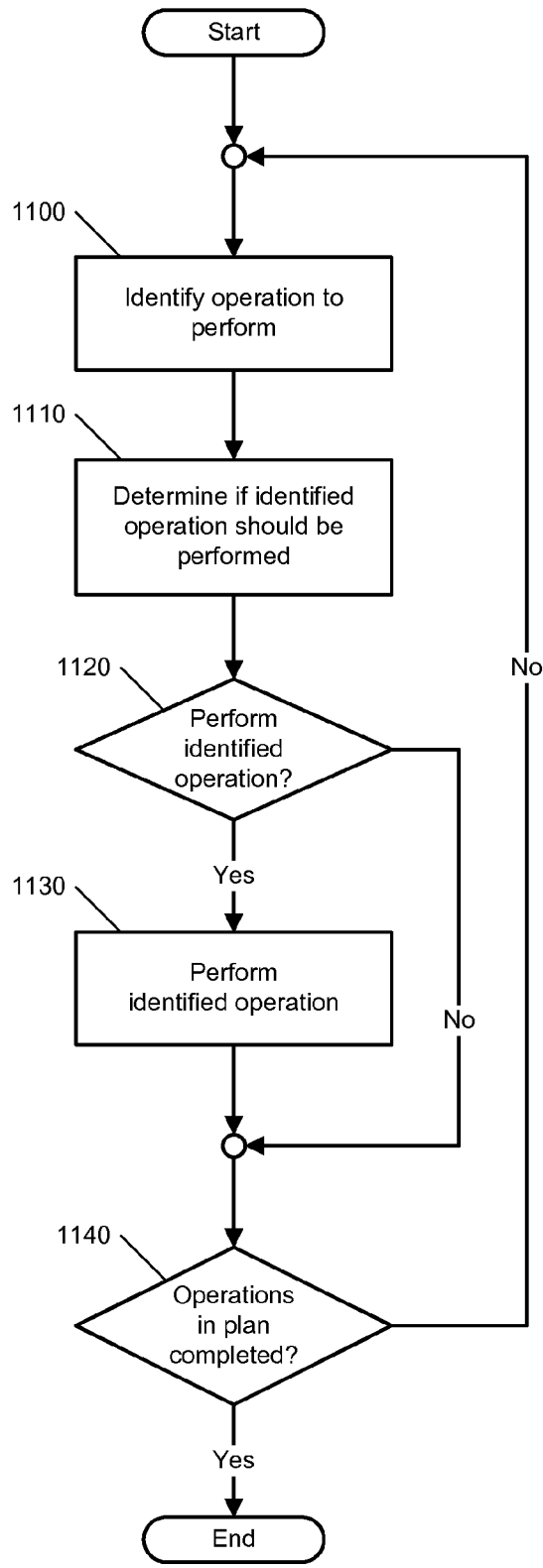
FIG. 11 is a flow diagram illustrating an example of operations specified by a plan according to embodiments of the present invention.

FIG. 11 is a flow diagram illustrating an example of a process of performing operations specified by a plan such as plan 705. The process begins with the identification of an operation to be performed, as specified by the plan (step 1100). Once a given operation is identified, a determination is made as to whether the identified operation should be performed (step 1110). If the identified operation should be performed (step 1120), the elements of the extensibility framework architecture that are involved with the operation, perform the identified operation (step 1130). Conversely, if a determination is made that the given operation identified by the plan should not be performed (steps 1110 and 1120), the current operation is skipped. In either case, the plan processing module of the extensibility framework architecture then determines whether any operations in the plan are yet to be completed (step 1140). If such further operations remain, the process loops back to the identification of the given operation (step 1100), and continues through the process just outlined. If no further operations remain (step 1140), the process concludes.

Figure 12:
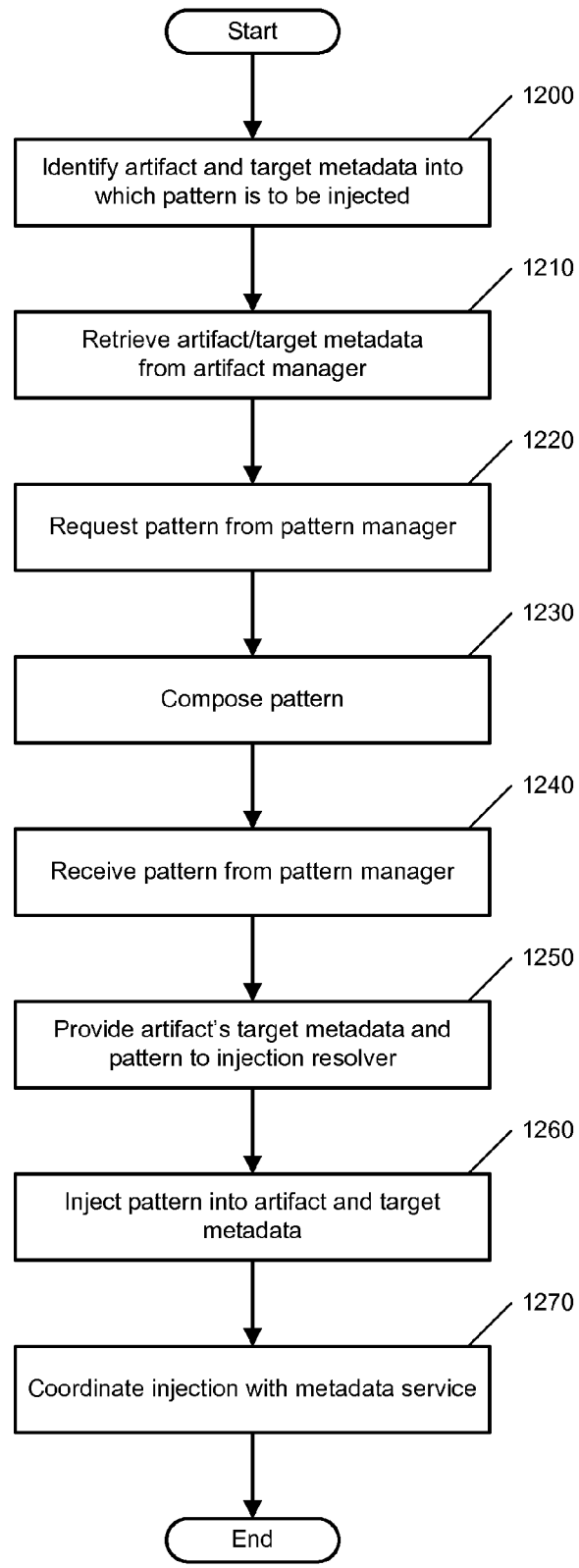
FIG. 12 is a flow diagram illustrating an example of the operations that can be specified by a plan according to embodiments of the present invention.

FIG. 12 is a flow diagram illustrating an example of the types of operations that can be specified by a plan according to embodiments of the present invention. As will be appreciated, in light of the present disclosure and in connection with FIGS. 10, 11 and 12, the operations depicted in the flowchart of FIG. 12 are organized in a sequential fashion, for the sake of simplicity (and so do not follow in the iterative flow of FIG. 11). The operations of the plan depicted in the flow diagram of FIG. 12 begin with the identification of an artifact and its target metadata (step 1200). As noted earlier, the target metadata thus identified is that metadata into which the pattern is to be injected. Next, the artifact and target metadata are retrieved from the artifact manager by the plan processing module (step 1210). In the manner noted earlier, a request (e.g., pattern request 730) is sent by the plan processing module to the pattern manager (step 1220). The pattern manager, in turn, composes the requested pattern (e.g., sample user interface pattern 736) (step 1230). The pattern manager then provides the requested pattern to the plan processing module, which receives the pattern from the pattern manager (step 1240). Having now received the artifact and target metadata, as well as the pattern to be injected therein, the plan processing module provides the artifact's target metadata and the pattern to the injection revolver (step 1250). Upon receipt of this information, the injection revolver performs the requisite operations to inject the pattern into the artifact and target metadata (step 1260). Having performed these operations, the plan processing module then coordinates the injection operation with the metadata service (step 1270).

The extensibility provided by an extensibility framework architecture such as extensibility framework architecture 700, in terms of runtime extensibility, provides several benefits, in the manner noted earlier herein. For example, a self-service programmer can extend and configure applications without having to write computer code. In certain implementations, such a programmer can make changes using a browser-based interface, which can, in turn, provide support to such users through the provision of wizards and flows. Further, the desired changes can be applied to the application without the need for restarting or re-deploying the application. Further still, such extensibility can be "additive and optional," being implemented only if doing so will enhance and augment the self-service programmer's use of the application.

Figure 13:
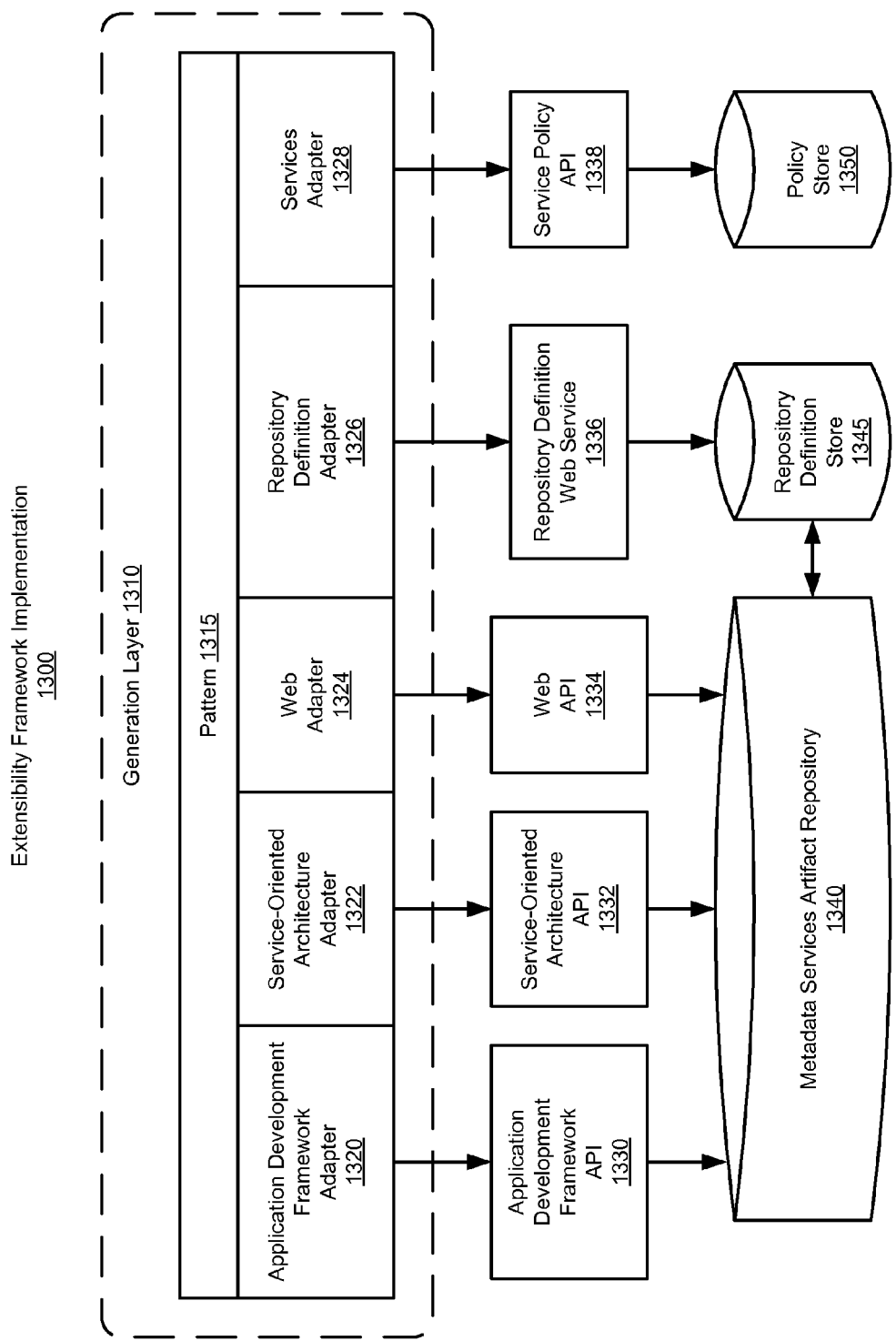
FIG. 13 is a block diagram illustrating an implementation of an extensibility framework architecture and the generation of customized software components according to embodiments of the present invention.

FIG. 13 is a block diagram illustrating an implementation of an extensibility framework architecture (e.g., extensibility framework architecture 700) and associated elements, for the generation of customized software components at runtime (depicted in FIG. 13 as an extensibility framework implementation 1300). Extensibility framework implementation 1300 includes a generation layer 1310, which, in turn, includes a pattern 1315. Pattern 1315, which is comparable, in at least certain of its features and functionalities, to pattern 734 of FIG. 7, for example. Pattern 1315, as part of generation layer 1310, is available for use in guiding the operations of a variety of adapters, in order to provide for the runtime generation of customized software components. Among the possible adapters with which pattern 1315 might interact, pattern 1315 is depicted in FIG. 13 as being available to an application development framework adapter 1320, a service-oriented architecture adapter 1322, a web adapter 1324, a repository definition adapter 1326, and a services adapter 1328. It will be further appreciated in view of the present disclosure that embodiments such as those described herein can, in generating the desired executables, employ a decision tree at runtime, to guide the self-service programmer in effecting the desired modifications and/or creating the desired functionality.

In turn, these adapters provide an interface between pattern 1315 (and so generation layer 1310) and a number of application programming interfaces (API). As will be appreciated in light of the present disclosure, the adapters of generation layer 1310 can provide access to a wide array of possible APIs. Among the possible APIs to which the adapters of generation layer 1310 can provide access are those shown in extensibility framework implementation 1300, which include an application development framework (ADF) API 1330, a service-oriented architecture (SOA) API 1332, a web API 1334, a repository definition web service API 1336 and a service policy API 1338. In certain embodiments, ADF API 1330 is used to support extensibility of user interfaces, data models, schema definitions (e.g., XML schema definitions), and other components of the given extensibility framework. Service policy API 1338 also supports extensibility by facilitating functional grants.

Application development framework API 1330, service-oriented architecture API 1332 and web API 1334 interface their corresponding adapters in generation layer 1310 to a metadata services artifact repository 1340. Metadata services artifact repository 1340 stores a variety of artifacts, among them ADF artifacts, SOA artifacts, web artifacts, and the like. Metadata services artifact repository 1340 is, for purposes of the present discussion, comparable to metadata repository 744 depicted in FIG. 7. It therefore follows that application development framework adapter 1320, service-oriented architecture adapter 1322, and web adapter 1324 are comparable to various ones of adapters 740(1)-(N) of FIG. 7. Pattern 1315, via repository definition adapter 1326 and repository definition web service API 1336, interfaces to a repository definition store 1345. Repository definition store 1345, in turn, provides repository definitions for metadata services artifact repository 1340. In certain implementations, repository definition store 1345 includes repository definitions that define fact tables and dimension tables (described subsequently, e.g., in connection with FIG. 17). Similarly, pattern 1315 is provided with access, via service policy API 1338, to a policy store 1350 via services adapter 1328 and service policy API 1338. In certain implementations, policy store 1350 can be accessed via service policy API 1338 using the Lightweight Directory Access Protocol mentioned earlier, in order to facilitate the management of access to the policy records therein.

Figure 14A:
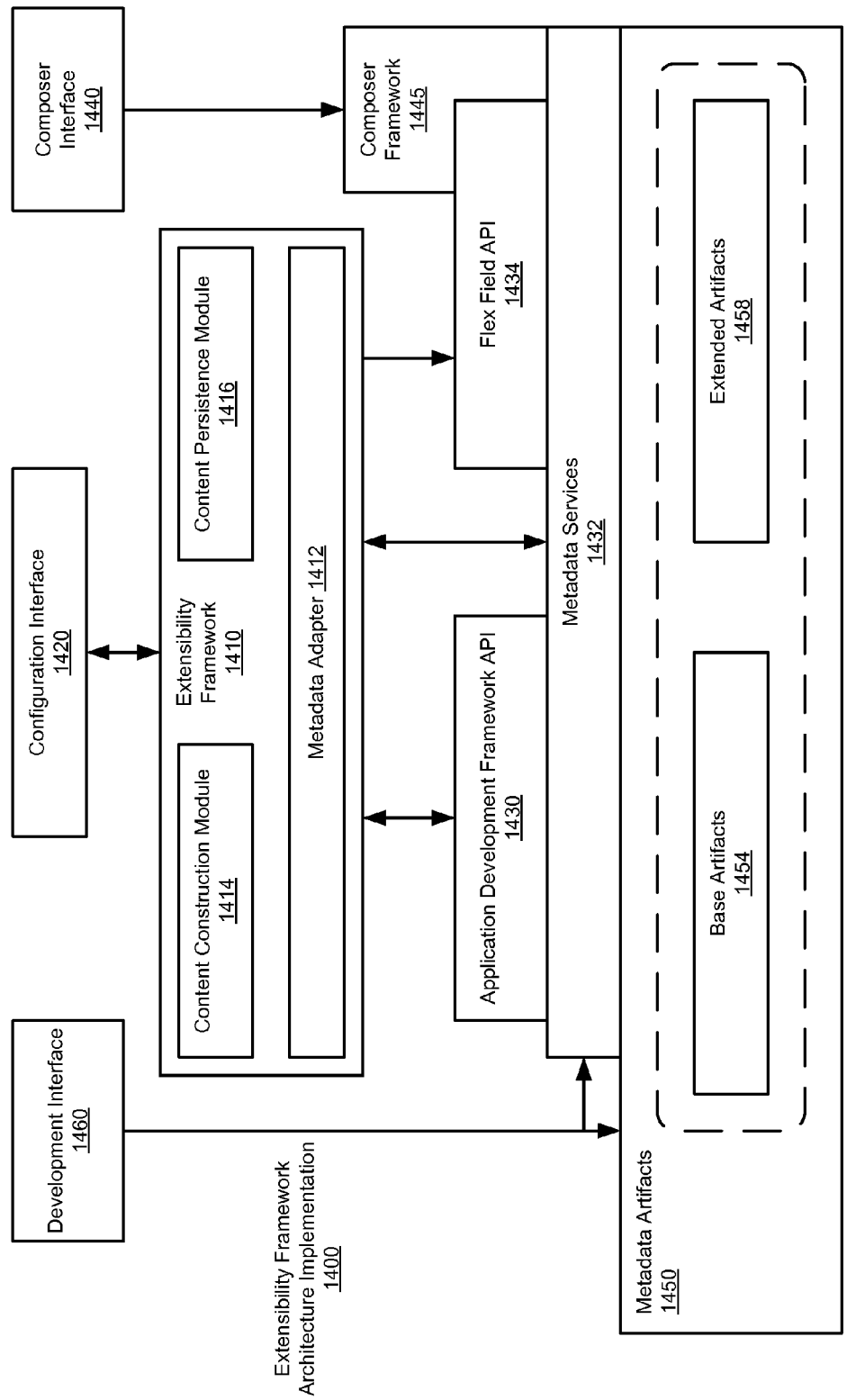
FIG. 14A is a block diagram illustrating an example architecture that includes an extensibility framework according to embodiments of the present invention.

FIG. 14A is a block diagram illustrating an example architecture of an implementation that includes an extensibility framework such as extensibility framework architecture 700 of FIG. 7, according to embodiments of the present invention (depicted in FIG. 14A as an extensibility framework architecture implementation 1400). Extensibility framework architecture implementation 1400 includes an extensibility framework 1410 (e.g., in the manner of extensibility framework architecture 700). In addition to including elements such as those depicted in FIG. 7 as being included in extensibility framework architecture 700, extensibility framework 1410 is depicted as also including a metadata adapter 1412, a content construction module 1414, and a content persistence module 1416. Metadata adapter 1412 facilitates access to the metadata artifacts of extensibility framework architecture implementation 1400 via the various APIs and services thereof. Content construction module 1414 facilitates the dynamic creation of content types by, for example, by supporting the extension of various database schemas within extensibility framework architecture implementation 1400, thereby facilitating various aspects of the customizations described herein. Among other features of and information within extensibility framework 1410, content persistence module 1416 facilitates the persistence of changes to extensibility framework 1410 by a self-service programmer (e.g., customizations created using extensibility framework 1410, as well modifications thereto), and thus, facilitates, for example, the persistence of such customizations, their attributes and other aspects thereof. In such a scenario, for example, such changes can be persisted for the duration of a self-service programmer's session. Alternatively, such changes can be persisted across sessions, in which case content persistence module 1416 causes the changes to be persisted to a metadata repository (e.g., such as metadata repository 744, metadata services artifact repository 1340, or the like, or that described subsequently in connection with extensibility framework architecture implementation 1400).

In the manner depicted in FIG. 7, extensibility framework 1410 interfaces with a configuration interface 1420, which allows a self-service programmer (e.g., an administrator or other user) to customize software components using extensibility framework 1410. In a manner comparable to that described earlier, extensibility framework 1410 receives one or more commands from configuration interface 1420 and, in turn, interacts with one of several interfaces in performing the operations specified by one or more plans identified in the command(s) received. To this end, extensibility framework 1410 interfaces with an application development framework API 1430, metadata services 1432 and/or a flex field API 1434. Flex field API 1434 facilitates the use of constructs such as extension columns and extension tables in implementations constructed in the manner of extensibility framework architecture implementation 1400. Extensibility framework architecture implementation 1400 provides access to metadata artifacts via a composer interface 1440. Composer interface 1440 provides an easy-to-use, declarative and programmable extensibility mechanism for customizing runtime editing to address, for example, end-user application requirements. Composer interface 1440, which can be implemented as a browser-based platform, provides such functionality by providing access to metadata services 1432 via a composer framework 1445 and flex field API 1434, while bypassing extensibility framework 1410 and its components. Composer framework 1445, in turn, provides a framework on which to build such customizable application pages.

Whether accessed using configuration interface 1420 or composer interface 1440, metadata services 1432, in turn, provide access to a set of metadata artifacts (depicted in FIG. 14A as metadata artifacts 1450). Metadata artifacts 1450 include base artifacts 1454, as well as extended artifacts 1458. Base artifacts 1454 can include, for example, constructs such as view objects, pages, page fragments, task flows, page definitions, and the like. Extended artifacts 1458 can include, for example, constructs such as composer artifacts, flex extended metadata, and the like. In addition to configuration interface 1420 (which is intended for use by self-service programmers) and composer interface 1440 (which is intended for use by programmers), programmers can also access metadata services 1432 and metadata artifacts 1450 directly using a development interface 1460.

In order for an extensibility framework implementation to support the generation of customization according to embodiments of the present invention, as well as runtime generation, a number of functionalities can be provided. For example, the module or application to be customized should be compatible with the extensibility framework (e.g., with respect to certain of the examples herein, metadata should be used to define content). Further, it is preferable that content not be coded, but rather generated. Such metadata should also employ runtime APIs to facilitate extension and/or the addition of content. Also, such metadata should use and/or integrate with the development framework employed (e.g., ADF) as the basis for data/objects. Such modules and applications preferably also read metadata at runtime without the need for server restart, and should define appropriate patterns for extensibility.

Further, and as will be appreciated from the present disclosure, various types of extensibility can be provided through extensibility framework implementation 1300. For example, types of constructs which can be made customizable, in an extensibility framework implementation according to embodiments of the present invention, include entities, attributes and relationships, and user interfaces, for example. Using these constructs as an example, once one or more extensible entities have been designated, new top-level entities (e.g., a Lease) and new child entities (e.g., Opportunity Decision Issues) can be added. Once such entities are added, their attributes and relationships can be extended by adding new attributes, as well as creating new "Relationships" (which employ foreign key (FK)-based relationships) and new "Context Links" (which do not employ FK-based relationships). In light of the foregoing extensions, the associated extensible user interface can be extended by creating a work area landing page. In one embodiment, one landing page is created for each (customized) entity, for example. Once a landing page has been created, the new attributes are exposed in pre-designated user interface elements. For a new "Context Link" relationship, a tree node (a child of entity "Customer") is created, while for a new "Relationship," a new sub-tab is created (though in this case, a parent entity page needs to be a sub-tab user interface).

Extensibility framework implementation 1300 also supports other type of extensibility. Other extensibility types include extensible services, extensible workflow events, extensible analytics, and extensible import/export. Operations involved in the extension of services include, for example, the addition of new attributes as elements in an entity's payload XML schema definition (XSD) and the creation of new payload XSD for the (customizable) entity. Extensible analytics provide functionality that includes, for example, providing custom attributes in existing reports, creating new reports using custom and standard entities, supporting drill-down and roll-up, and supporting group-by and aggregation operations. Support for extensible workflow events includes, for example, the creation of email notification, the updating of dependent fields, the creation of user tasks, and the sending of outbound services. Support for extensible import/export operations includes, for example, providing custom attributes in existing import/export operations and supporting import/export for custom entities.

Further still, the various extensibility types in an extensibility framework implementation can be "pre-seeded" (i.e., pre-configured), and so provide pre-configured metadata artifacts (e.g., pre-configured middleware metadata artifacts). Such pre-configuration can be accomplished using a development interface such as development interface 1460, and includes pre-configured artifacts for data extensibility, user interface extensibility, data security extensibility, functional security extensibility, business event extensibility, analytics extensibility, and web service extensibility, among other possible pre-configured artifacts.

With regard to data extensibility, pre-configured artifacts can include flex columns in the base table, entity object attributes for flex columns in base entity object, child extension tables on a per base parent table basis, a child entity object for each child extension table, providing an association between a parent entity object and a child entity object, providing a top-level extension table (e.g., on a per logical business area (LBA) basis), providing a top-level extension entity object for each extension table, and allowing a resource bundle override on a per application basis. With regard to user interface extensibility, a customizable unbound task flow is provided for adding new work area, as is an application menu for adding new menu items.

An entity object according to embodiments of the present invention is an extensibility framework component that represents a row in the specified data source and simplifies modifying its associated attributes. Importantly, it facilitates the encapsulation of domain business logic, which, in turn, helps to ensure that business policies and rules are validated in a consistent fashion. Entity objects support numerous declarative business logic features to enforce the validity of data. Such constructs not only provide for declarative validation, but also provide for additional custom application logic and business rules, thereby facilitating encapsulation of the requisite domain business logic into each entity object.

Entity objects thus support the implementation of a variety of conceptual features in an extensibility framework according to embodiments of the present invention. For example, an entity object is defined, at least in part, by specifying the database table, the rows of which the entity object represents. As such, a self-service programmer can create associations between such rows, in order to reflect relationships between entity objects (e.g., using a view link, as described subsequently). Further, at runtime, an entity object's database table row(s) (also referred to herein as entity row(s)) can be managed using an entity definition object corresponding to the given entity object. Each such entity row can be identified, for example, by a corresponding row key, for example. Further, such entity rows are retrieved and modified in the context of an application module (or more simply, an application) that provides the database transaction.

With regard to data security extensibility, a parameterized instance set is provided for top-level extension tables, as well as the granting of certain privileges to pre-defined roles. With regard to functional security extensibility, privileges can also be granted to pre-defined roles. Additionally, source code grants in Java authorization data can be provided to allow access to the service policy API (e.g., service policy API 1338). With regard to business events extensibility, the architecture can provide for the annotation of attributes in a given email template, for example. With regard to analytics extensibility, provision can be made for flex attributes in an entity object for a view object, and similarly, flex columns in the physical and logical tables of repository definition store 1345 can be provided. In providing such analytics extensibility, however, the architecture should ensure that a given view object is a superset of the user interface view object attributes (e.g., by ensuring that the attribute names match). With regard to web service extensibility, extensibility can be provided in several ways, including, for example, the provision of a polymorphic view object (e.g., on a per base view object basis), for XSD generation. Web service extensibility can also be facilitated through the provision of view links, which link a base view object and a polymorphic view object. A top-level polymorphic view object (e.g., on a per LBA basis) can also be provided, in order to facilitate web service extensibility.

A view object, according to embodiments of the present invention, is an extensibility framework component that provides various features and advantages, including the encapsulation of one or more database queries (e.g., SQL queries), as well as simplifying working with the results thereof. Several types of view objects can be implemented in an extensibility framework according to embodiments of the present invention, including, for example, read-only view objects, entity-based view objects (to allow data updates to be performed), static data view objects (e.g., for data defined by the view object itself), and programmatically-populated view objects, among others. An entity-based view object (i.e., a view object based on an entity object) can be configured to support updatable rows, and so, such view objects can map their attributes to the attributes of one or more existing entity objects. Such a mapped entity object is saved as an entity usage in the view object's view object definition. In this way, entity-based view objects can cooperate with entity objects, and so provide for an updatable data model. The entity-based view object can then query just the data needed for the client-facing task, and rely on its mapped entity object(s) to validate and save changes made to its view rows Like the read-only view object, an entity-based view object provides for the encapsulation of one or more queries, can be linked into master-detail hierarchies, and can be used in the data model of applications.

Various embodiments of the present invention provide read-only view objects having unique runtime features. For example, in certain embodiments, view objects with no entity usage definition are read-only by default. Such read-only view objects therefore do not acquire entity-derived default values, do not reflect pending changes, and do not reflect updated reference information, among other such characteristics. In contrast to entity-based view objects, read-only view objects require a user to program a query using the applicable query language (e.g., SQL query language). Additionally, as an alternative to creating view objects that specify queries (e.g., a SQL statement) at design time, entity-mapped view objects can be created that dynamically generate queries (e.g., a SQL statements) at runtime.

Various embodiments of the present invention provide entity-based view objects having unique runtime features. For example, in certain embodiments, if a view object has one or more underlying entity usages, new rows can be created, and queried rows, modified or removed. An entity-based view object according to embodiments of the present invention coordinates with underlying entity objects to enforce business rules and to save changes to the database. In addition, entity-based view objects can also provide various capabilities that do not exist with read-only view objects. For example, changes in cached information (updates, inserts, deletes and so on) managed by an entity are persisted (i.e., survive) the view object's execution boundary. Further in this regard, changes made to relevant entity object attributes through other view objects in the same transaction are immediately reflected throughout those entity objects in the same transaction affected by such changes, and attribute values of new rows can be initialized to the values from the underlying entity object attributes. Further still, changes to foreign key (FK) attribute values result in reference information being updated. An updatable view object can be defined by referencing attributes from one or more entity objects, with view links defined based on underlying entity associations. It will be appreciated that such entity-based view objects are typically used in the context of the application facilitating the transaction.

Figure 14B:
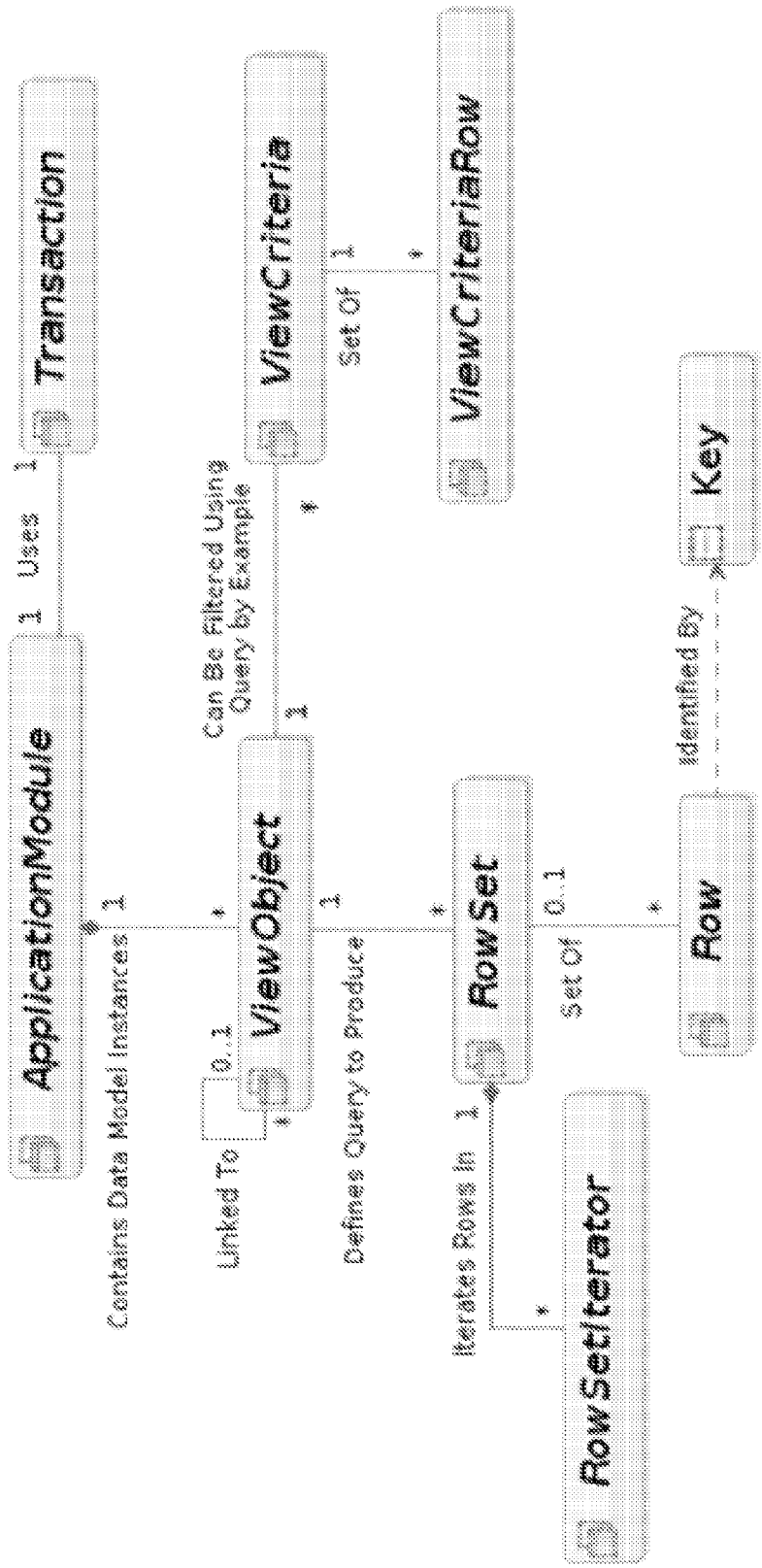
FIG. 14B is a block diagram illustrating an example of a view object according to embodiments of the present invention, and its relationships to other elements of an extensibility framework according to embodiments of the present invention.

FIG. 14B is a block diagram illustrating an example of a view object according to embodiments of the present invention, and the functionality provided thereby. Also depicted in FIG. 14B are examples of the relationships that such a view object can have to other logical constructs and elements of an extensibility framework such as extensibility framework 1410, for example. Thus, as will be appreciated from the aforementioned functionality and relationships, such a view object is able to define one or more queries and produce one or more rows (e.g., a row set of rows), in the manner discussed previously.

Figure 14C:
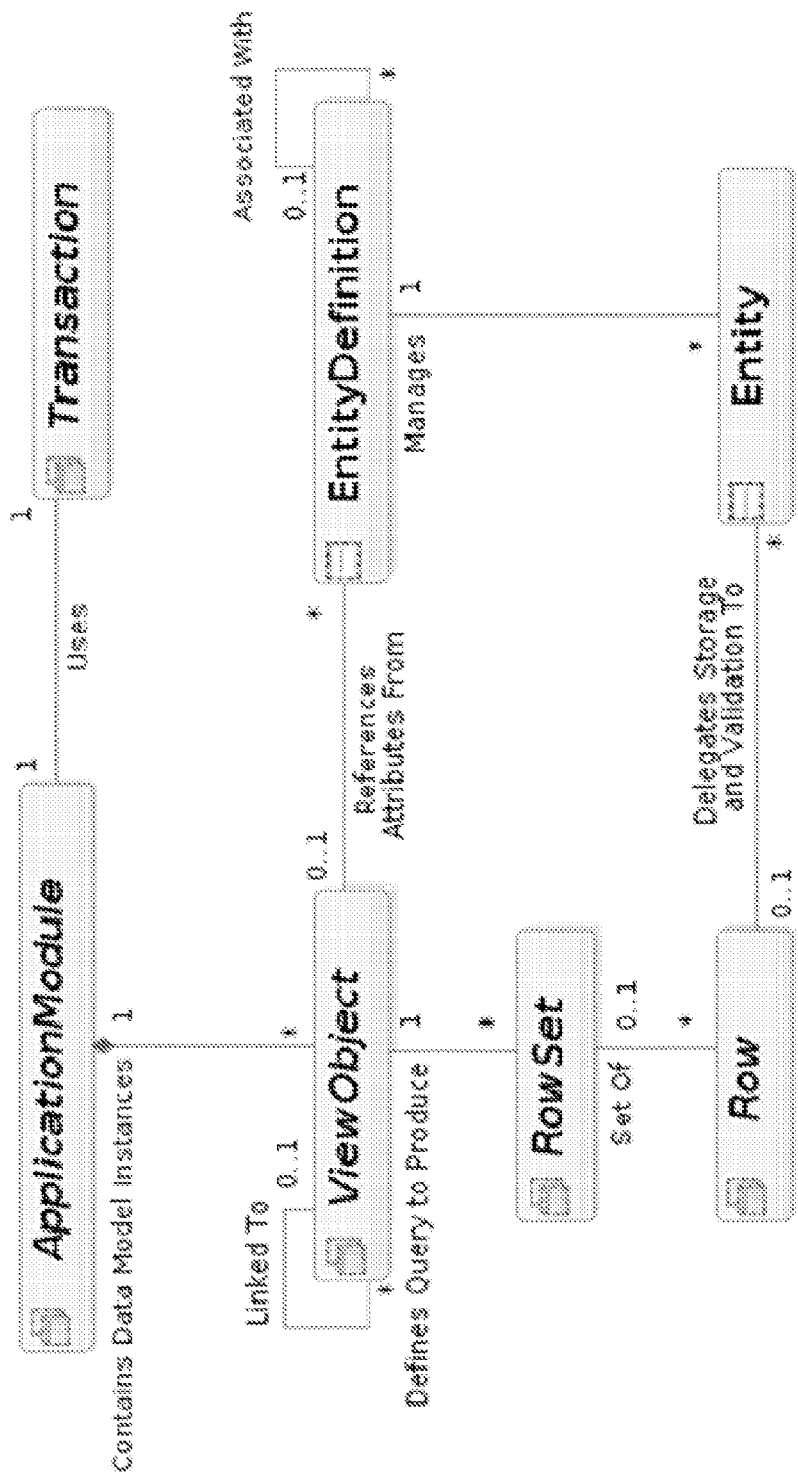
FIG. 14C is a block diagram illustrating an example of the interactions and relationships between the elements of an entity object and a view object, according to embodiments of the present invention.

FIG. 14C is a block diagram illustrating an example of the interactions and relationships between the elements of an entity object and a view object, according to embodiments of the present invention. The logical constructs illustrated in FIG. 14C demonstrate, among other features and advantages, the interactions and relationships that exist between elements of the aforementioned view objects and entity objects, in certain implementations, which facilitate the provision of an updatable data model.

Figure 15:
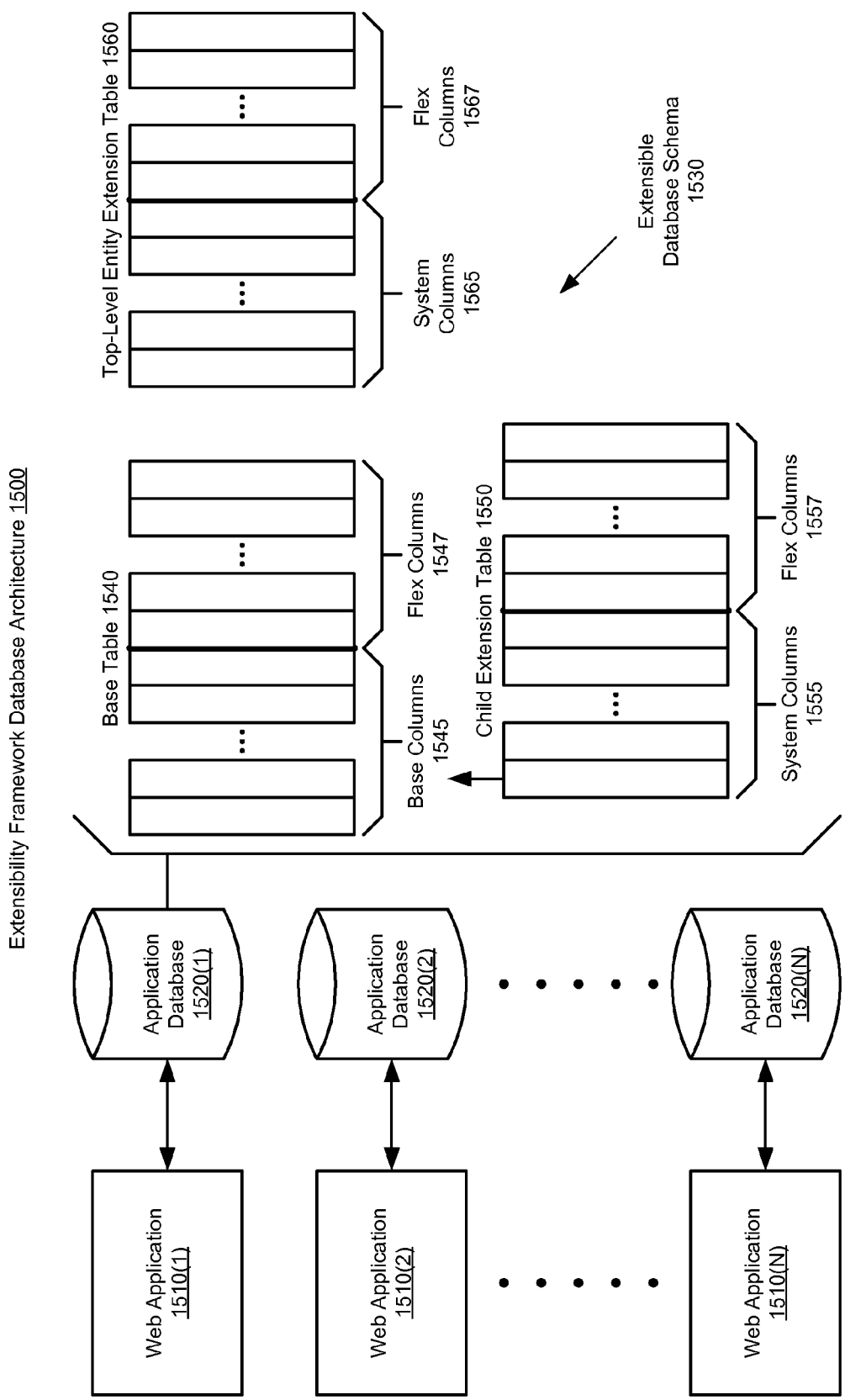
FIG. 15 is a block diagram illustrating various features of an extensibility framework database architecture according to embodiments of the present invention.

FIG. 15 is a block diagram illustrating various features of an extensibility framework database architecture 1500 according to embodiments of the present invention, which provides examples of data model extensibility, user interface extensibility, data security extensibility, and functional security extensibility. In the example architecture illustrated in FIG. 15, a number of web applications (depicted in FIG. 15 as web applications 1510(1)-(N), which can be executed, for example, by web servers 230) are designed to access a corresponding one of application databases (depicted in FIG. 15 as application databases 1520(1)-(N)). As will be appreciated from the present disclosure, while each of web applications 1501(1)-(N) is illustrated as interfacing with a corresponding one of application databases 1520(1)-(N), such a 1:1 relationship is neither mandatory, nor necessarily desirable, and so the architecture illustrated in FIG. 15 should be viewed merely as an example of any number of possible architectures that might be constructed according to embodiments of the present invention.

As is further illustrated in FIG. 15, application database 1520(1) is structured according to an extensible database schema 1530. Extensible database schema 1530 includes a base table 1540, which, in turn, includes base columns 1545 and flex columns 1547. Extensible database schema 1530 also includes a child extension table 1550 for base table 1540. Child extension table 1550, in turn, includes system columns 1555 and flex columns 1557. Further still, extensible database schema 1530 also includes a top-level entity extension table 1560. Top-level entity extension table 1560, in turn, includes system columns 1565 and flex columns 1567.

The foregoing description provides an example of the pre-configuration that can be effected in an extensibility framework database architecture according to embodiments of the present invention (e.g., via one or more of configuration interface 1420, composer interface 1440 or development interface 1460). In the example depicted in FIG. 15, flex columns 1547 of base table 1540 are depicted as being pre-configured. Also pre-configured are child extension table 1550 (e.g., one child extension table per base table) and top-level entity extension table 1560 (e.g., one top-level entity table per LBA).

In the manner noted throughout the present disclosure (and with regard to the extensibility types noted earlier), patterns can be employed to provide a variety of extensible features for each of the aforementioned extensibility types. For example, in the manner noted earlier with regard to data extensibility, pre-configured artifacts can include a child extension table, a top-level entity extension table, and/or flex columns (e.g., in the base table, the child extension table, and/or the top-level entity extension table). Patterns that provide such extensibility are presented in Table 1 as data model extensibility example patterns, which employ the pre-configured extensibility elements listed therein, and so can be used to generate a variety of such extensible features. As noted in Table 1, a pattern such as a create custom attribute pattern uses flex columns in a base table, and generates, for example, an attribute in view object, a label, flex metadata and/or the like. Table 1 also includes a create child entity pattern, which uses a child extension table (e.g., on a per base parent table basis) to generate, for example, a child entity view object, which can, in turn, can have its flex columns used to create new attributes (in a manner comparable to that just noted). Also included in Table 1 is a create top-level entity pattern, which uses a top-level extension table and a top-level extension entity object for the extension table to generate a top-level entity view object, flex metadata and/or the like.

TABLE 1

Data Model Extensibility Example Patterns.

| Pattern Name | Pre-configured Extensibility Elements | Generates |
|---|---|---|
| Create custom attribute | Flex columns in a base table<br>Entity object attributes for flex columns<br>Resource bundle override per application | Attribute in view object<br>Label in override resource bundle<br>Flex metadata |
| Create custom pick list attribute (supports, e.g., an M:1 relationship between source and target view objects) | Same as custom attribute | FK attribute in source view object<br>Accessing target view object in the pick list<br>View access in source view object<br>List binding in source view object<br>View criteria in target view object<br>Flex metadata |
| Create child entity | Child extension table per base parent table<br>Child entity object for child extension table<br>Association between parent and child entity objects | Child entity view object<br>Master-detail relationship<br>View link between parent and child view objects<br>View link usage in application module<br>Flex metadata |
| Create top-level entity | Top-level extension table per LBA<br>Top-level extension entity object for extension table | Top-level entity view object<br>View usage in application module<br>Flex metadata |
| Top-level extension table per LBA<br>Top-level extension entity object for extension table | Top-level extension table per LBA<br>Top-level extension entity object for extension table | Top-level extension table per LBA<br>Top-level extension entity object for extension table |
| Create 1:M relationship between source and target view objects | None | FK attribute in target view object<br>Reference relationship<br>View link between source and target view objects<br>View link access in target view object<br>View link usage in application module<br>Generate flex metadata |
| Create Saved Search | None | View criteria on the queried view object |
| Create context link (joined query - relationship w/o FK) | None | View criteria on the queried view object<br>View usage specific for view criteria |

With regard to user interface extensibility, a customizable unbound task flow is provided for adding new work areas, as is an application menu for adding new menu items. Patterns that provide such extensibility are presented in Table 2 as user interface extensibility example patterns, which employ the pre-configured extensibility elements listed therein, and so can be used to generate a variety of such extensible features.

TABLE 2

User Interface Extensibility Example Patterns.

| Pattern Name | Pre-configured Extensibility Element | Generates |
|---|---|---|
| Create user interface component for custom attribute | None | User interface component in page fragment<br>Attribute or tree binding in page definition |
| Create sub-tab in object detail page for displaying child entities, reference entities, context link results (creates one-page task flow as well as the corresponding region to display the task flow) | None | New page fragment for displaying sub-tab content<br>Empty display table and entry form in page fragment<br>Binding and iterator in page definition<br>Page mapping in binding context file<br>Attributes to display in new page fragment<br>User interface component in page fragment<br>Attribute or tree binding in page definition<br>Task flow definition to contain the new page fragment<br>Region to display sub-tab content in object detail page<br>Region in object detail page fragment<br>Task flow executable in object detail page definition |

TABLE 2-continued

User Interface Extensibility Example Patterns.

| Pattern Name | Pre-configured Extensibility Element | Generates |
|---|---|---|
| Create workflow area for top-level entity | Customizable unbound task flow to reference custom landing page Application menu to reference custom work list menu per work area Include pre-configured application menu into the root menu of the web application | One-page task flow for Overview page (local search component, object summary table) Object detail page Object create page Object edit page Regional search Landing page Java server page and page definition Insert new landing page in unbound task flow Update menu structure Task list menu for launching work area task flows Include task list menu in pre-seeded application menu Insert menu item in navigator menu for landing page |

With regard to data security extensibility, a parameterized instance set is provided for top-level extension tables, as well as the granting of certain privileges to pre-defined roles. Patterns that provide such extensibility are presented in Table 3 as data security extensibility example patterns, which employ the pre-configured extensibility elements listed therein, and so can be used to generate a variety of such extensible features.

TABLE 3

Data Security Extensibility Example Patterns.

| Pattern Name | Pre-configured Extensibility Elements | Generates |
|---|---|---|
| Create custom attribute Same security as containing entity | None | None |
| Create child entity Same security as parent row | None | None |
| Create top-level entity For standard operations (Query, Update, Delete) | Parameterized instance set for top-level extension table Privileges granted to pre-defined role | Data grant by passing in entity type as instance set parameter |

With regard to functional security extensibility, privileges can also be granted to pre-defined roles. Patterns that provide such extensibility are presented in Table 4 as functional security extensibility example patterns, which employ the pre-configured extensibility elements listed therein, and so can be used to generate a variety of such extensible features.

TABLE 4

Functional Security Extensibility Example Patterns.

| Pattern Name | Pre-configured Extensibility Elements | Generates |
|---|---|---|
| Create custom user interface component same security as containing page fragment | None | None |
| Create child entity sub-tab use parent row privileges to control standard user interface actions in sub-tab task flow | None | Expression to evaluate parent row privileges Task flow parameters for passing parent row privileges into sub-tab task flow |
| Create work area generate privileges for user interface artifacts | Privileges granted to pre-defined role Source code grant in Java authorization data for | Create permission set for generated user interface artifacts Region privilege for landing page Task flow privilege for each task flow |

TABLE 4-continued

Functional Security Extensibility Example Patterns.

| Pattern Name | Pre-configured Extensibility Elements | Generates |
| --- | --- | --- |
| use entity row privileges to control standard user interface actions in work area task flows | accessing service policy API | Permission set to group privileges Functional grant for permission set Use entity row privileges for standard actions Expression to evaluate entity row privileges Task flow parameters for passing entity row privileges into work area task flow |

Figure 16:
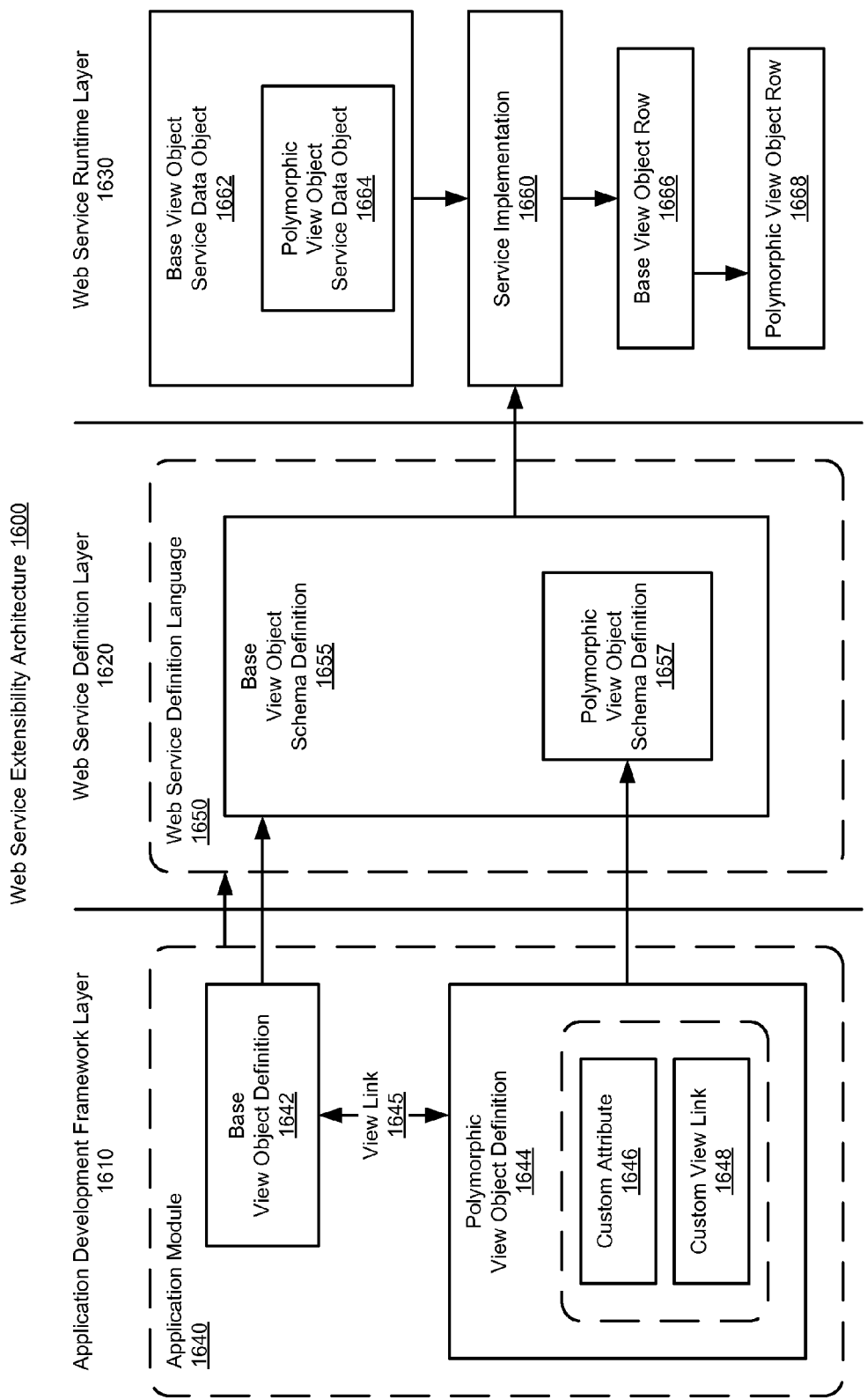
FIG. 16 is a block diagram illustrating a web service extensibility architecture according to embodiments of the present invention.

FIG. 16 is a block diagram illustrating a web service extensibility architecture 1600, according to embodiments of the present invention, which provides examples of web service extensibility and business event extensibility. Web service extensibility architecture 1600 includes a variety of abstracted layers, including an application development framework layer 1610, a web service definition layer 1620 and a web service runtime layer 1630. Application development framework layer 1610 includes an application (depicted in FIG. 16 as an application module 1640). In turn, application module 1640 includes a base view object definition 1642 and a polymorphic view object definition 1644. Information regarding relationship between base view object definition 1642 and polymorphic view object definition 1644 is represented by a view link 1645 (which, as shown, links a base view object and a polymorphic view object). In turn, polymorphic view object definition 1644 includes elements such as a custom attribute 1646 and a custom view link 1648.

In ADF layer 1610, application module 1640 includes a variety of definitional constructs that facilitate the definition of view object schemas in web service definition layer 1620, and employ an object definition language in doing so. These schema definitions (e.g., view object schema definitions), in turn, facilitate the generation of runtime constructs in web service runtime layer 1630. Further, one or more view links (e.g., view link 1645) can be generated between parent and child view objects, such as the base and polymorphic view object definitions of FIG. 16 (base view object definition 1642 and polymorphic view object definition 1644). As noted above, polymorphic view object definition 1644 is shown in FIG. 16 as including custom attribute 1646 and custom view link 1648, which are examples of custom/customizable features available to a self-service programmer using web service extensibility architecture 1600. Further still, as will be appreciated in light of the present disclosure, these (and other) constructs of polymorphic view object definition 1644 facilitate the polymorphic nature of polymorphic view object definition 1644.

Web service definition layer 1620 includes information in a web service definition language 1650, such as a base view object schema definition 1655. In turn, base view object schema definition 1655 can include elements such as a polymorphic view object schema definition 1657. As can be seen in FIG. 16, application module 1640 is defined in web service definition layer 1620 using web service definition language 1650, via the relationships between base view object definition 1642 and base view object schema definition 1655, as well as between polymorphic view object 1644 and polymorphic object schema definition 1657.

In web service definition layer 1620, the view object definitions from ADF layer 1610 serve as the basis for the view object schema definitions defined in web service definition layer 1620 and implemented in web service definition language 1650 (e.g., base view object schema definition 1655 and polymorphic object schema definition 1657). Base view object schema definition 1655, including polymorphic object schema definition 1657, serves as a basis for a service implementation in web service runtime layer 1630. As will be appreciated in light of the present disclosure, base view object schema definition 1655 and polymorphic object schema definition 1657 are database schema that provide for extensibility constructs and functionalities such as those described in connection with extensible database schema 1530 of FIG. 15. More specifically, such extensibility constructs (and their associated functionalities) include, for example, flex columns 1547 of base table 1540, child extension table 1550 (and so flex columns 1557), and top-level entity extension table 1560 (and so flex columns 1567).

As noted, base view object schema definition 1655 (and so, polymorphic view object schema definition 1657) serve as the basis for a service implementation (an example of which is depicted in FIG. 16 as service implementation 1660), which is an element of web service runtime layer 1630. In supporting extensibility, service implementation 1660 takes as input a base view object service data object 1662. Base view object service data object 1662 includes a polymorphic view object service data object 1664. Base view object service data object 1662 and polymorphic view object service data object 1664 provide extensibility constructs which define a universe within which a self-service programmer can create, modify and remove constructs and functionality as necessary, in order to achieve their intended results. Based on such inputs (e.g., schema definitions, data objects, their polymorphisms, and other such extensibility constructs and inputs), service implementation 1660 produces, as output, a base view object row 1666, which comprehends (or can comprehend) a polymorphic view object row 1668. As will be appreciated, extensibility constructs such as those depicted in FIG. 15 facilitate the extensibility of view object rows such as base view object row 1666 and polymorphic view object row 1668.

As noted earlier herein, web service extensibility can be provided in a number of ways, including, for example, the provision of polymorphic view objects for XSD generation. Patterns that provide such extensibility are presented in Table 5 as web service extensibility example patterns, which employ the pre-configured extensibility elements listed therein, and so can be used to generate a variety of such extensible features.

TABLE 5

Web Service Extensibility Example Patterns.

| Pattern Name | Pre-configured Extensibility Elements | Generates |
|---|---|---|
| Create custom attribute | Polymorphic view object for XSD generation<br>View link for base view object to polymorphic view object | View object attribute in polymorphic view object<br>XSD for polymorphic view object |
| Create child entity | Same as custom attribute | View link in polymorphic view object<br>XSD for polymorphic view object<br>XSD for the child entity |
| Create top-level entity | "Proxy" polymorphic view object for XSD generation<br>Web services description language constructs and service implementation | View link from proxy view object to custom entity view object<br>XSD for the proxy view object<br>XSD for custom entity view object |

With regard to business events extensibility, the architecture can provide for the annotation of attributes in a given email template, for example. Patterns that provide such extensibility are presented in Table 6 as business events extensibility example patterns, which employ the pre-configured extensibility elements listed therein, and so can be used to generate a variety of such extensible features.

TABLE 6

Business Event Extensibility Example Patterns.

| Pattern Name | Pre-configured Extensibility Elements | Generates |
|---|---|---|
| Event | None | Event definition<br>Event publication |
| Action - email notification | Annotate attributes available in email template<br>Email notification in process execution language process (e.g., one for all apps) | HTML email template |
| Action - field update | Field update in process execution language process (e.g., one for all apps) | None |
| Action - task creation | Task creation in process execution language process (e.g., one for all apps) | None |
| Action - outbound web service | Outbound web service in process execution language process (e.g., one for all apps) | None |

Figure 17:
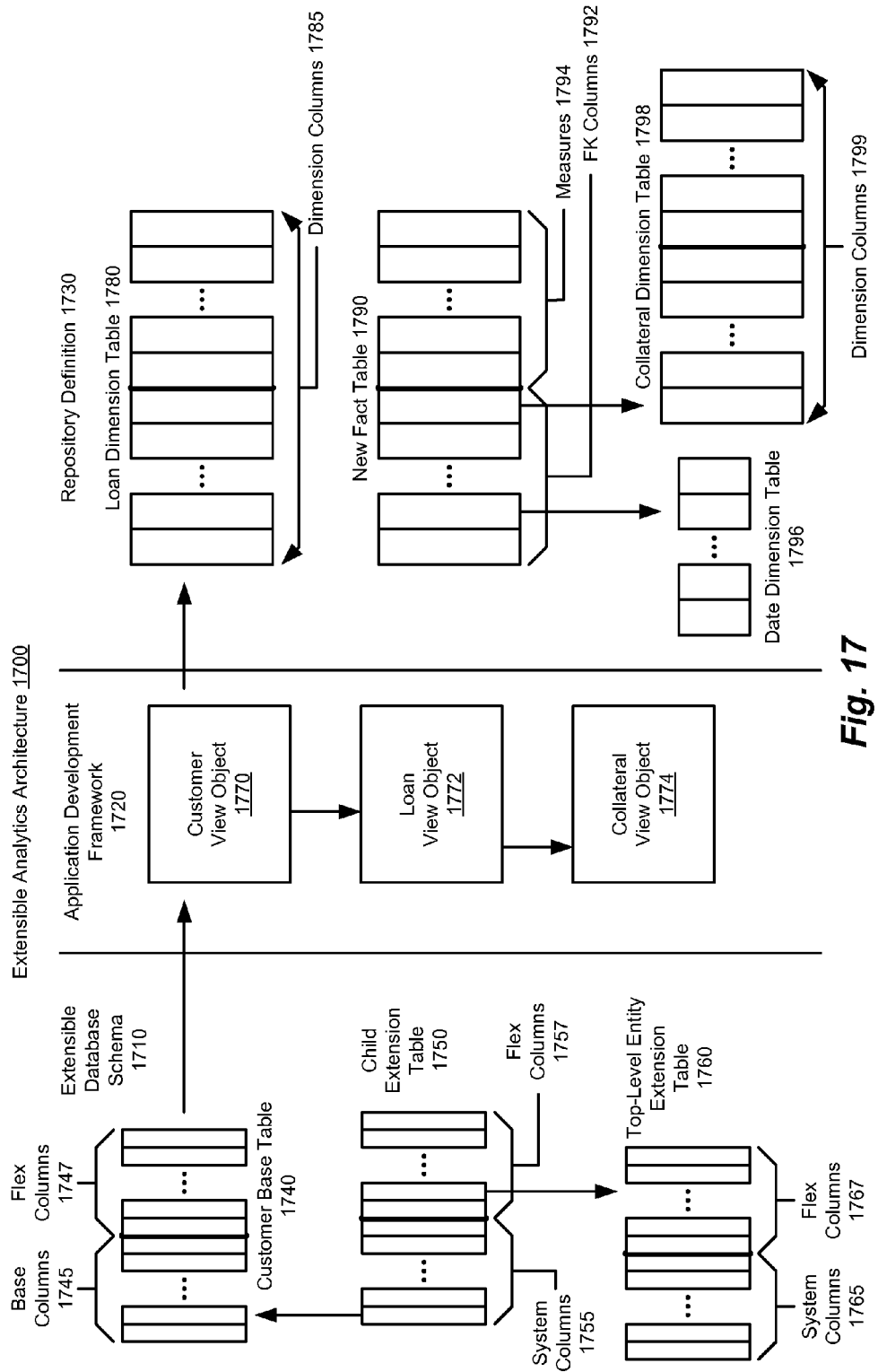
FIG. 17 is a block diagram illustrating an extensible analytics architecture according to embodiments of the present invention.

FIG. 17 is a block diagram illustrating an extensible analytics architecture 1700, which is an implementation according to embodiments of the present invention, which provides an example of analytics extensibility. Illustrated as an element of extensible analytics architecture 1700 is an extensible database schema 1710. As can be seen, extensible database schema 1710 has a structure comparable to that of database schema 1530, which allows extensible database schema 1710 to support extensibility by allowing the definition, creation, modification and deletion of various extensible features via its support for patterns.

Extensible analytics architecture 1700 also includes an application development framework 1720, which includes objects based on the structures of extensible database schema 1710. Thus, extensible database schema 1710 provides a universe in which a self-service programmer (using application development framework 1720) is able to define, create, modify and/or delete a wide variety of extensible features using a simple, efficient and intention-based paradigm. Application development framework 1720, in turn, produces the structures illustrated in FIG. 17 as a repository definition 1730, based on the objects made available in application development framework 1720 for use (e.g., extension) through extensible database schema 1710.

As just noted, extensible database schema 1710 includes elements comparable to those of database schema 1530, as noted. Such elements are included, for example, in an application database structured according to extensible database schema 1710. Extensible database schema 1710 includes a customer base table 1740, which, in turn, includes base columns 1745 and flex columns 1747. Extensible database schema 1710 also includes a child extension table 1750 for customer base table 1740. Child extension table 1750, in turn, includes system columns 1755 and flex columns 1757. Further still, extensible database schema 1710 also includes a top-level entity extension table 1760. Top-level entity extension table 1760, in turn, includes system columns 1765 and flex columns 1767.

Based on extensible database schema 1710, a self-service programmer is able to work with a variety of objects in application development framework 1720, in order to generate a repository definition (e.g., repository definition 1730). Among such objects are, for example, a customer view object 1770, a loan view object 1772 and a collateral view object 1774. These objects provide the requisite underpinnings for application development framework 1720 to generate repository definition 1730.

In the example illustrated in FIG. 17, repository definition 1730 includes the results of customizing the aforementioned objects using one or more patterns. In the example depicted in FIG. 17, the artifacts thus generated include a loan dimension table 1780 having one or more dimension columns 1785. Repository definition 1730 also includes a new fact table 1790 having foreign key (FK) columns 1792 and measures columns 1794. As will be appreciated in light of the present disclosure, a foreign key is typically a primary key of an entity to which the foreign key is related. As will be further appreciated, in terms of a database environment (e.g., a relational database), a foreign key is used in conjunction with the attributes of a weak entity (i.e., an entity that cannot be uniquely identified by its attributes alone) to create a primary key. FK column 1792 can, in turn, reference other dimension tables, for example, a data dimension table 1796 and a collateral dimension table 1798 (itself having one or more dimension columns 1799).

Table 7 presents a variety of analytic extensibility example use cases, which demonstrate the extension (extensibility operation) performed, the table type involved (e.g., in the examples presented in Table 7, a fact table or dimension table).

TABLE 7

Analytic Extensibility Example Use Cases.

| Extension | Table Type | Mapping | View Object |
|---|---|---|---|
| Add new attributes | Fact Table | New attributes go into existing fact table as measures or as dimension foreign keys (date) | New attributes are added to existing view object for the underlying object |
| | Dimension Table | New attributes added to existing dimension and are used as display attributes | New attributes are added to existing view object for the underlying object |
| Add new child object | Fact Table | Support creation of a new fact table using child as grain level | Create new view object for new fact |
| | Dimension Table | Create new dimension table for child and allow other facts to join to this (e.g., parent fact table) | Create new view object for new dimension. Add view links to existing fact view objects |
| Add new top-level object | Fact Table | Support creation of a new fact table using top-level object as grain. This object can be the primary fact for a new star. | Create new view object for new fact |
| | Dimension Table | Create new dimension table for top-level object and allow other facts to join to this (for related objects) | Create new view object for new dimension. Add view links to existing fact view objects |
| Add new relationship | Fact Table | Support creation of a (new) new fact table using the related objects as grain level | Create new view object for new Fact |

In general terms, analytics extensibility can be provided in a number of ways, including the provision of flex attributes in an entity object, and similarly, flex columns in the physical and logical tables of the resulting repository definition store. Patterns that provide such extensibility are presented in Table 8 as analytics extensibility example patterns, which employ the pre-configured extensibility elements listed therein, and so can be used to generate a variety of such extensible features.

TABLE 8

Analytic Extensibility Example Patterns.

| Pattern Name | Pre-configured Extensibility Elements | Generates |
|---|---|---|
| Add Custom Attribute to "Report Type" | Flex attribute in entity object for view object Flex columns in repository definition physical and logical tables | View object attributes in view object Labels as session variables |
| Create New Report type using standard and custom entities | None | Fact and dimension view object Fact and dimension repository definition physical tables Physical column and table Physical key Dimension repository definition logical tables Logical column and table Default dimension hierarchy Fact repository definition logical tables Logical column and table Measure definition Join with dimension table |

An Example Computing and Network Environment

As shown above, the present invention can be implemented using a variety of computer systems and networks. An example of one such computing and network environment is described below with reference to FIGS. 18 and 19.

Figure 18:
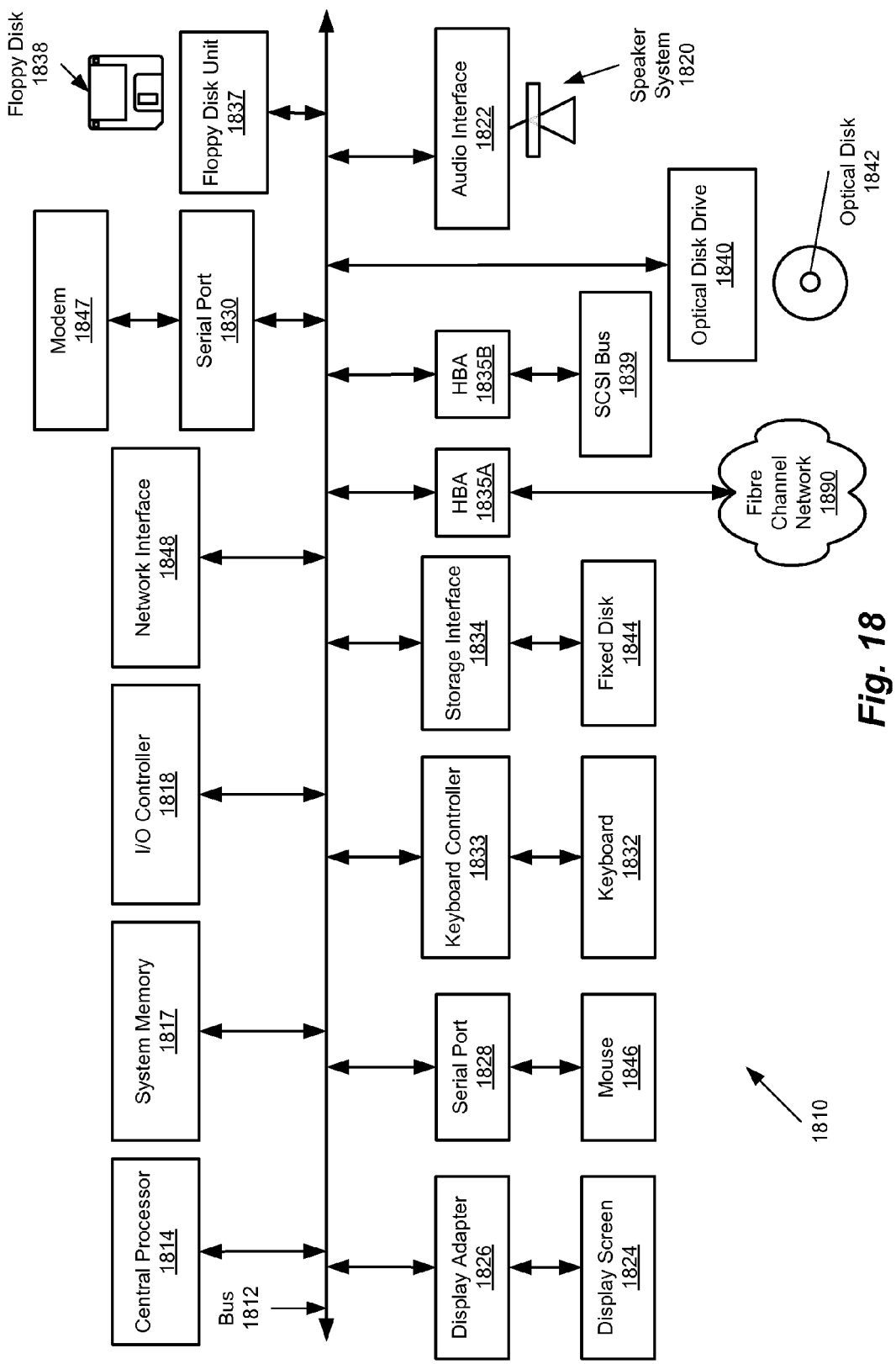
FIG. 18 is a block diagram depicting a computer system suitable for implementing aspects of the present invention.

FIG. 18 depicts a block diagram of a computer system 1810 suitable for implementing aspects of the present invention (e.g., servers 620, gateway server 650, clients 660 and web clients 665). Computer system 1810 includes a bus 1812 which interconnects major subsystems of computer system 1810, such as a central processor 1814, a system memory 1817 (typically RAM, but which may also include ROM, flash RAM, or the like), an input/output controller 1818, an external audio device, such as a speaker system 1820 via an audio output interface 1822, an external device, such as a display screen 1824 via display adapter 1826, serial ports 1828 and 1830, a keyboard 1832 (interfaced with a keyboard controller 1833), a storage interface 1834, a floppy disk drive 1837 operative to receive a floppy disk 1838, a host bus adapter (HBA) interface card 1835A operative to connect with a Fibre Channel network 1890, a host bus adapter (HBA) interface card 1835B operative to connect to a SCSI bus 1839, and an optical disk drive 1840 operative to receive an optical disk 1842. Also included are a mouse 1846 (or other point-and-click device, coupled to bus 1812 via serial port 1828), a modem 1847 (coupled to bus 1812 via serial port 1830), and a network interface 1848 (coupled directly to bus 1812).

Bus 1812 allows data communication between central processor 1814 and system memory 1817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1810 are generally stored on and accessed via a computer-readable medium, such as a hard disk drive (e.g., fixed disk 1844), an optical drive (e.g., optical drive 1840), a floppy disk unit 1837, or other storage medium.

Storage interface 1834, as with the other storage interfaces of computer system 1810, can connect to a standard computer-readable medium for storage and/or retrieval of information, such as a fixed disk drive 1844. Fixed disk drive 1844 may be a part of computer system 1810 or may be separate and accessed through other interface systems. Modem 1847 may provide a direct connection to a remote server via a telephone link or to the Internet via an internet service provider (ISP). Network interface 1848 may provide a direct connection to a remote server via a direct network link to the Internet via a POP (point of presence). Network interface 1848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 18 need not be present to practice the present invention. The devices and subsystems can be interconnected in different ways from that shown in FIG. 18. The operation of a computer system such as that shown in FIG. 18 is readily known in the art and is not discussed in detail in this application. Code to implement the present invention can be stored in computer-readable storage media such as one or more of system memory 1817, fixed disk 1844, optical disk 1842, or floppy disk 1838. The operating system provided on computer system 1810 may be MS-DOS®, MS-WINDOWS®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 19:
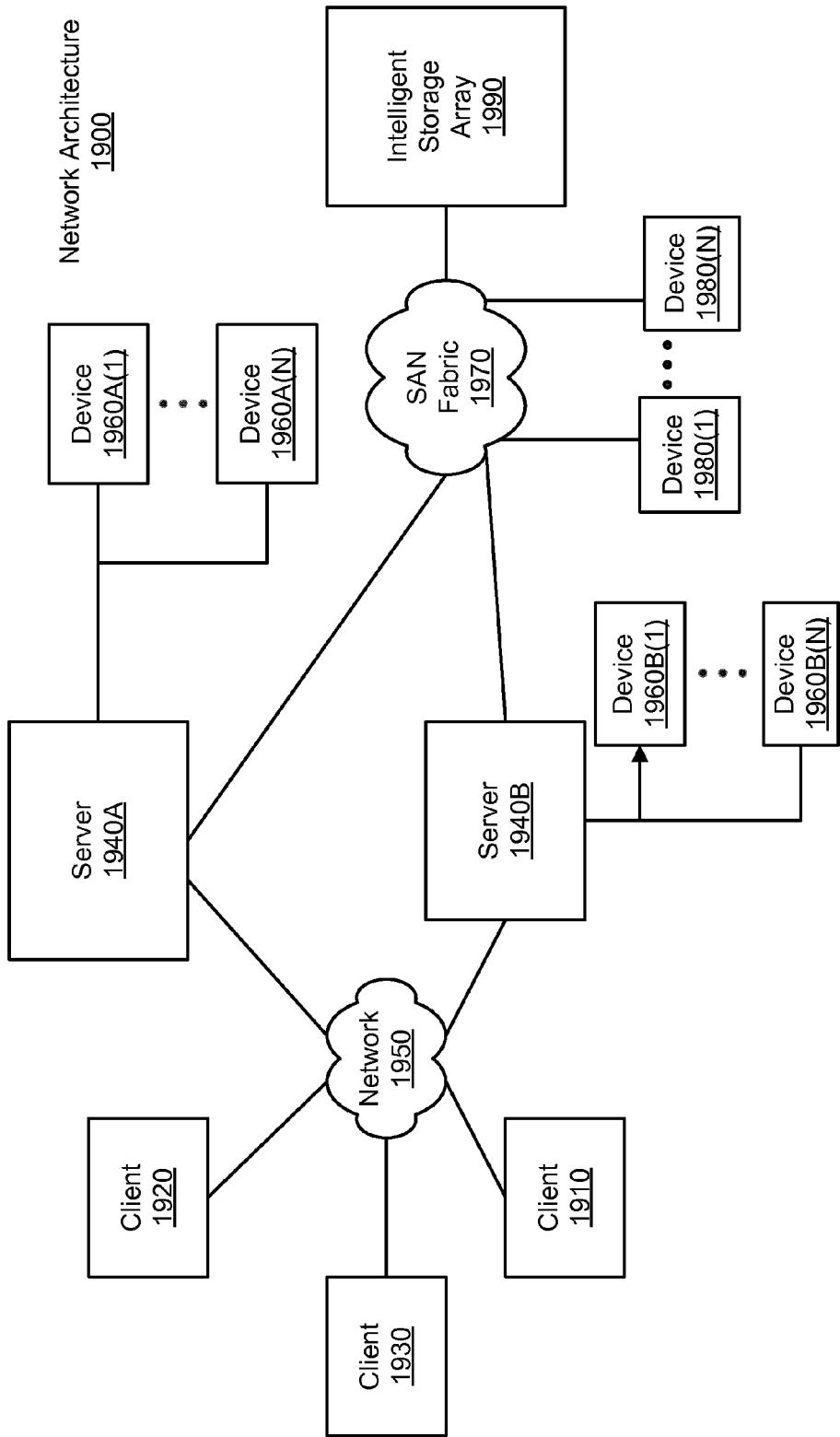
FIG. 19 is a block diagram depicting a network architecture suitable for implementing aspects of the present invention.

FIG. 19 is a block diagram depicting a network architecture 1900 in which client systems 1910, 1920 and 1930, as well as storage servers 1940A and 1940B (any of which can be implemented using computer system 1910), are coupled to a network 1950. Storage server 1940A is further depicted as having storage devices 1960A(1)-(N) directly attached, and storage server 1940B is depicted with storage devices 1960B(1)-(N) directly attached. Storage servers 1940A and 1940B are also connected to a SAN fabric 1970, although connection to a storage area network is not required for operation of the invention. SAN fabric 1970 supports access to storage devices 1980(1)-(N) by storage servers 1940A and 1940B, and so by client systems 1110, 1120 and 1130 via network 1150. Intelligent storage array 1190 is also shown as an example of a specific storage device accessible via SAN fabric 1970.

With reference to computer system 1810, modem 1847, network interface 1848 or some other method can be used to provide connectivity from each of client computer systems 1910, 1920 and 1930 to network 1950. Client systems 1910, 1920 and 1930 are able to access information on storage server 1940A or 1940B using, for example, a web browser or other client software (not shown). Such a client allows client systems 1910, 1920 and 1930 to access data hosted by storage server 1940A or 1940B or one of storage devices 1960A(1)-(N), 1960B(1)-(N), 1980(1)-(N) or intelligent storage array 1990. FIG. 19 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1810). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 6.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
identifying a problem domain of a plurality of problem domains, wherein
the problem domain represents a plurality of problems;
receiving a selection, wherein
the selection identifies a first pattern of a plurality of patterns,
each of the plurality of patterns is associated with the problem domain;
defining one or more rules;
determining whether the first pattern is compatible with a second pattern of the plurality of patterns, wherein
the first pattern and the second pattern are configured to
describe, at least in part, a general solution to a class of problems of a corresponding classes of problems of the plurality of problems, and
facilitate generation of at least a portion of an enterprise software object,
the determining is based, at least in part, on at least one of
the second pattern, or
the enterprise software object,
the determining comprises restricting the selection according to the one or more rules, wherein
the one or more rules are associated with the plurality of patterns, and
a rule of the one or more rules enforces compatibility between patterns of the plurality of patterns; and
in response to a determination that the first pattern is compatible with the second pattern,
generating a first configured pattern by configuring the first pattern, wherein
the first configured pattern describes, at least in part, a specific solution to a specific instance of a problem of the class of problems,
the generating the first configured pattern comprises
providing, at least in part, the specific solution by
identifying one or more modifications to be made to the first pattern, and
generating domain code that represents the one or more modifications, wherein
the domain code is associated with a desired platform of a plurality of platforms,
the domain code is configured to be used to generate executable code, and
generating the enterprise software object, wherein
the generating the enterprise software object is based, at least in part, on the first configured pattern, and
the enterprise software object is configured to provide, at least in part, the specific solution.

2. The method of claim 1, further comprising:
creating a second configured pattern by configuring the second pattern, wherein
the second configured pattern describes, at least in part, the specific solution to the specific instance of the problem of the class of problems,
the generating the enterprise software object is further based, at least in part, on the second configured pattern, and
the enterprise software object comprises one or more of
a record object,
a business logic object,
a business process object, or
a user interface object.

3. The method of claim 1, further comprising:
receiving a value, wherein
one or more parameters are associated with the first pattern, and
the value is for a parameter of the one or more parameters.

4. The method of claim 1, further comprising:
defining one or more rules.

5. The method of claim 3, wherein
the value is configured to define a characteristic of the enterprise software object.

6. The method of claim 1, wherein the
one or more rules include one or more sub-pattern rules associated with a plurality of sub-patterns associated with at least one pattern of the plurality of patterns, wherein
the sub-pattern rules constrain combinations of values and
combinations of the plurality of sub-patterns.

7. The method of claim 6, further comprising:
receiving a value, wherein
one or more parameters are associated with the first pattern,
the value is for a parameter of the one or more parameters, and a rule of the one or more rules is configured to limit the parameter to an appropriate value.

8. The method of claim 7, further comprising:
selecting the rule of the one or more rules, wherein
the rule of the one or more rules is selected based on information regarding an enterprise for which the enterprise software object is to be generated, and
the rule of the one or more rules governs permissible combinations of the plurality of patterns.

9. The method of claim 1, wherein the first pattern comprises
a configuration option for the enterprise software object.

10. The method of claim 9, wherein the first pattern further comprises:
one or more generation details for the enterprise software object.

11. The method of claim 9, wherein the configuration options comprise:
one or more aspects, wherein
the one or more aspects specify one or more requirements for the first pattern as instantiated in the enterprise software object,
each of the one or more aspects is configured to be translated independently, and
each of the one or more aspects is associated with a corresponding content provider of a plurality of content providers.

12. The method of claim 1, further comprising:
executing the enterprise software object in a cloud computing environment, wherein
the generating the enterprise software object is performed in the cloud computing environment, and
the selection is received by a computing device of the cloud computing environment.

13. A computer program product comprising:
a plurality of instructions, comprising
a first set of instructions, executable on a computer system, configured to identify a problem domain of a plurality of problem domains, wherein
the problem domain represents a plurality of problems,
a second set of instructions, executable on the computer system, configured to receive a selection, wherein
the selection identifies a first pattern of a plurality of patterns, and
each of the plurality of patterns is associated with the problem domain,
a third set of instructions, executable on the computer system, configured to define one or more rules, and
determine whether the first pattern is compatible with a second pattern of the plurality of patterns, wherein
the first pattern and the second pattern are configured to
describe, at least in part, a general solution to a class of problems of a corresponding classes of problems of the plurality of problems, and
facilitate generation of at least a portion of an enterprise software object,
the determination of whether the first pattern is compatible with the second pattern is based, at least in part, on at least one of
the second pattern, or
the enterprise software object, and
the determination comprises restricting the selection according to the one or more rules, wherein the one or more rules are associated with the plurality of patterns, and
a rule of the one or more rules enforces compatibility between patterns of the plurality of patterns,
a fourth set of instructions, executable on the computer system, configured to, in response to a determination that the first pattern is compatible with the second pattern,
generate a first configured pattern by configuring the first pattern, wherein
the first configured pattern describes, at least in part, a specific solution to a specific instance of a problem of the class of problems,
the first configured pattern is generated by providing, at least in part, the specific solution by identifying one or more modifications to be made to the first pattern, and
generating domain code that represents the one or more modifications, wherein
the domain code is associated with a desired platform of a plurality of platforms,
the domain code is configured to be used to generate executable code, and
generate the enterprise software object, wherein
the fourth set of instructions uses the first configured pattern to generate, at least in part, the enterprise software object, and
the enterprise software object is configured to provide, at least in part, the specific solution; and
a non-transitory computer-readable storage medium, wherein the instructions are encoded in the non-transitory computer-readable storage medium.

14. The computer program product of claim 13, further comprising:
a fifth set of instructions, executable on the computer system, configured to create a second configured pattern by configuring the second pattern, wherein
the second configured pattern describes, at least in part, the specific solution to the specific instance of the problem of the class of problems,
the generation of the enterprise software object is further based, at least in part, on the second configured pattern, and
the enterprise software object comprises one or more of
a record object,
a business process object, or
a user interface object.

15. The computer program product of claim 13, wherein the third set of instructions further comprise:
a fifth set of instructions, executable on the computer system, configured to receive a value, wherein
one or more parameters are associated with the first pattern,
the value is for a parameter of the one or more parameters, and
the value is configured to define a characteristic of the enterprise software object.

16. The computer program product of claim 13, wherein the instructions further comprise:
a fifth set of instructions, executable on the computer system, configured to select a rule of one or more rules, wherein
the rule of the one or more rules is selected based on information regarding an enterprise for which the enterprise software object is to be generated, and the rule of the one or more rules governs permissible combinations of the plurality of patterns, and a sixth set of instructions, executable on the computer system, configured to restrict the selection according to the rule of the one or more rules, wherein
the one or more rules are associated with at least one of
the plurality of patterns, or
the enterprise software object,
the rule of the one or more rules governs permissible combinations of the plurality of patterns, and
the rule of the one or more rules is configured to limit the parameter to an appropriate value.

17. The computer program product of claim 13, wherein the first pattern comprises one or more of
a configuration option for the enterprise software object,
one or more generation details for the enterprise software object, or
one or more aspects specifying requirements for the first pattern as instantiated in the enterprise software object.

18. The computer program product of claim 13, wherein the instructions further comprise:
a fifth set of instructions, executable on the computer system, configured to execute the enterprise software object in a cloud computing environment, wherein
the plurality of instructions are configured to be executed in the cloud computing environment.

19. A computer system comprising:
a processor;
a computer-readable medium, coupled to the processor; and
a plurality of instructions, wherein
the instructions are encoded in the computer-readable medium, and
the instructions are configured to cause the processor to
identify a problem domain of a plurality of problem domains, wherein the problem domain represents a plurality of problems,
receive a selection, wherein
the selection identifies a first pattern of a plurality of patterns, and
each of the plurality of patterns is associated with the problem domain,
define one or more rules,
determine whether the first pattern is compatible with a second pattern of the plurality of patterns, wherein
the first pattern and the second pattern are configured to
describe, at least in part, a general solution to a class of problems of a corresponding classes of problems of the plurality of problems, and
facilitate generation of at least a portion of an enterprise software object,
the determine is based, at least in part, on at least one of
the second pattern, or
the enterprise software object, and
the determine comprises restricting the selection according to the one or more rules, wherein
the one or more rules are associated with the plurality of patterns, and
a rule of the one or more rules enforces compatibility between patterns of the plurality of patterns,
in response to a determination that the first pattern is compatible with the second pattern,
generate a first configured pattern by configuring the first pattern, wherein
the first configured pattern describes, at least in part, a specific solution to a specific instance of a problem of the class of problems,
the first configured pattern is generated by providing, at least in part, the specific solution by identifying one or more modifications to be made to the first pattern, and
generating domain code that represents the one or more modifications, wherein
the domain code is associated with a desired platform of a plurality of platforms,
the domain code is configured to be used to generate executable code, and
generate the enterprise software object, wherein
the generation of the enterprise software object is based, at least in part, on the first configured pattern, and
the enterprise software object is configured to provide, at least in part, the specific solution.

20. The method of claim 1, wherein
each of the plurality of patterns is configured to facilitate generation of at least a portion of a corresponding one of a plurality of enterprise software objects,
the portion of the enterprise software object is one of a plurality of enterprise software objects, and
the second pattern was selected for use in the generation of the enterprise software object.

21. The method of claim 1, wherein
the first pattern is identified by reverse-translation.

* * * * *

UNITED STATES PATENT AND TRADEMARK OFFICE
CERTIFICATE OF CORRECTION

| | | |
|---|---|---|
| PATENT NO. | : 9,535,663 B2 | Page 1 of 1 |
| APPLICATION NO. | : 13/236022 | |
| DATED | : January 3, 2017 | |
| INVENTOR(S) | : Yaseen et al. | |

It is certified that error appears in the above-identified patent and that said Letters Patent is hereby corrected as shown below:

On the Title Page

On page 2, Column 2, under Other Publications, Line 11, delete "AEM" and insert -- ACM --, therefor.

In the Specification

In Column 9, Line 21, after "detail" insert -- . --.

In Column 37, Line 7, delete "rows" and insert -- rows. --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*